(12) United States Patent
Ronk et al.

(10) Patent No.: US 9,739,489 B2
(45) Date of Patent: Aug. 22, 2017

(54) MONITORING SYSTEM AND METHOD FOR MONITORING A ROOM

(71) Applicant: STOVMINDER, LLC, Houston, TX (US)

(72) Inventors: John Ronk, Franklin, TN (US); Bob Ewell, Moscow, ID (US); Douglas Garmany, Pineland, TX (US); Charles T. Kelly, Houston, TX (US)

(73) Assignee: STOVMINDER, LLC, Houston, TX (US)

( * ) Notice: Subject to any disclaimer, the term of this patent is extended or adjusted under 35 U.S.C. 154(b) by 0 days.

(21) Appl. No.: 15/147,585

(22) Filed: May 5, 2016

(65) Prior Publication Data

US 2016/0245531 A1    Aug. 25, 2016

Related U.S. Application Data

(63) Continuation-in-part of application No. 14/586,352, filed on Dec. 30, 2014, now Pat. No. 9,389,020.
(Continued)

(51) Int. Cl.
*H05B 1/02* (2006.01)
*F24C 7/08* (2006.01)
(Continued)

(52) U.S. Cl.
CPC .............. *F24C 7/08* (2013.01); *A47J 27/212* (2013.01); *A47J 27/21083* (2013.01);
(Continued)

(58) Field of Classification Search
CPC ...... F24C 7/08; F24C 15/2021; H05B 1/0261; H05B 1/0263; H05B 3/0078; A47J 31/52;
(Continued)

(56) References Cited

U.S. PATENT DOCUMENTS 4,782,420 A    11/1988  Holdgaard-Jensen
5,318,224 A    6/1994   Darby et al.
(Continued)

OTHER PUBLICATIONS

Notice of Allowance for U.S. Appl. No. 14/586,352 (Mailed on Mar. 11, 2016), filed Dec. 30, 2014.

*Primary Examiner* — Mark Paschall
(74) *Attorney, Agent, or Firm* — Schmeiser, Olsen & Watts, LLP

(57) ABSTRACT

Disclosed herein is a monitoring system including a detecting device configured to detect at least one of smoke and heat, an alarm in operable communication with the detecting device, wherein the alarm is configured to notify a user after the detecting device detects at least one of smoke and heat, a sensing structure configured to determine whether a heating apparatus has a temperature that is above a threshold, and a processor in operable communication with the sensing structure and at least one of the detecting device and the alarm, the processor configured to at least one of turn off at least one of the alarm and the detecting device; and reduce the sensitivity of the detecting device, when the sensing structure determines that the heating apparatus has a temperature that is above a threshold.

19 Claims, 17 Drawing Sheets

Related U.S. Application Data which is a continuation-in-part of application No. 14/107,720, filed on Dec. 16, 2013, now Pat. No. 8,921,743, which is a continuation-in-part of application No. 12/909,902, filed on Oct. 22, 2010, now Pat. No. 8,610,036.

(60) Provisional application No. 62/248,916, filed on Oct. 30, 2015.

(51) Int. Cl.
| | |
|---|---|
| *F24C 15/20* | (2006.01) |
| *G08B 17/06* | (2006.01) |
| *A47J 31/52* | (2006.01) |
| *A47J 36/32* | (2006.01) |
| *A47J 27/21* | (2006.01) |
| *A47J 27/212* | (2006.01) |
| *A47J 27/62* | (2006.01) |
| *F27D 21/00* | (2006.01) |
| *F27D 21/04* | (2006.01) |

(52) U.S. Cl.
CPC ............... *A47J 27/62* (2013.01); *A47J 31/52* (2013.01); *A47J 36/32* (2013.01); *F24C 15/2021* (2013.01); *F27D 21/0014* (2013.01); *F27D 21/04* (2013.01); *G08B 17/06* (2013.01); *H05B 1/0261* (2013.01)

(58) Field of Classification Search
CPC ...... A47J 36/32; A47J 27/21083; A47J 27/62; F24D 21/0014; F24D 21/04; G05B 17/07
USPC .............. 219/494, 497, 212, 483, 413, 492; 99/325
See application file for complete search history.

(56) References Cited

U.S. PATENT DOCUMENTS

| | | |
|---|---|---|
| 5,541,579 A | 7/1996 | Kiernan |
| 5,608,383 A | 3/1997 | Neil |
| 5,628,242 A | 5/1997 | Higley |
| 5,717,188 A | 2/1998 | Vaillancourt |
| 5,723,846 A | 3/1998 | Koether et al. |
| 5,734,206 A | 3/1998 | Keizer et al. |
| 5,796,346 A | 8/1998 | Wash et al. |
| 5,805,767 A | 9/1998 | Jouas et al. |
| 5,909,378 A | 6/1999 | De Milleville |
| 5,945,017 A | 8/1999 | Cheng et al. |
| 6,013,901 A | 1/2000 | Lavoie |
| 6,130,413 A | 10/2000 | Rak |
| 6,294,994 B1 | 9/2001 | Hoellerich |
| 6,411,215 B1 | 6/2002 | Shnier |
| 7,002,109 B2 | 2/2006 | Klask |
| 7,005,986 B2 | 2/2006 | Parks, III et al. |
| 7,798,139 B2 | 9/2010 | Gagas et al. |
| 7,802,618 B2 | 9/2010 | Simon et al. |
| 8,610,036 B2 | 12/2013 | Ewell, Jr. et al. |
| 8,921,743 B2 | 12/2014 | Ewell, Jr. et al. |
| 2006/0044133 A1* | 3/2006 | Lou ............................ F24C 7/08 340/531 |
| 2007/0084849 A1 | 4/2007 | Smith et al. |
| 2007/0176766 A1* | 8/2007 | Cheng ..................... G08B 17/10 340/527 |
| 2009/0017404 A1 | 1/2009 | White et al. |
| 2009/0212038 A1 | 8/2009 | Aahlander |
| 2009/0294434 A1 | 12/2009 | Fonseca |
| 2010/0238036 A1* | 9/2010 | Holcombe ................ G08B 3/10 340/629 |
| 2010/0253531 A1* | 10/2010 | Qiu ............................ G08B 5/36 340/691.3 |
| 2011/0241877 A1* | 10/2011 | Wedig ..................... G08B 7/066 340/540 |
| 2011/0317007 A1 | 12/2011 | Kim |

\* cited by examiner

MONITORING SYSTEM AND METHOD FOR MONITORING A ROOM

RELATED APPLICATIONS

This application is a continuation-in-part application of and claims priority from U.S. patent application Ser. No. 14/586,352, now U.S. Pat. No. 9,389,020, filed Dec. 30, 2014, and entitled "Device and Method for Monitoring a Heating Appliance, which is a continuation-in-part and claims priority to U.S. patent application Ser. No. 14/107,720, now U.S. Pat. No. 8,921,743 filed Dec. 16, 2013, and entitled "Device and Method for Monitoring a Heating Appliance, which is a continuation-in-part and claims priority to U.S. patent application Ser. No. 12/909,902, now U.S. Pat. No. 8,610,036 filed Oct. 22, 2010 and now U.S. Pat. No. 8,610,036 and entitled "Device and Method for Monitoring a Heating Appliance," the disclosures of which are each incorporated herein by reference in their entirety to the extent that they are not inconsistent with the present disclosure.

FIELD OF THE INVENTION

The subject matter disclosed herein relates generally to a device and method for monitoring a heating appliance. More particularly, the subject matter relates to a device and method for alerting a user when a heating appliance is on and left unattended.

BACKGROUND OF THE INVENTION

Heating appliances such as stoves, ovens, grills, fryers, and the like should be monitored regularly when in use. Forgetting about a heating appliance may result in an over cooked meal. However, an overcooked meal may be a minor concern when compared with the potential safety hazard caused by leaving a heating appliance unattended. This is because items left on the stove, oven, grill, fryer, and the like may overheat, resulting in the production of smoke and fire. In such a situation, a standard fire alarm may not alert a user until after flames have already ignited. This is because fire alarms typically sense the presence of smoke, which is an immediate precursor to a fire. As a result, heating appliances can be extremely dangerous to an unwary and forgetful user.

Thus, a device and method for alerting a user when a heating appliance is on and left unattended would be well received in the art.

BRIEF DESCRIPTION OF THE INVENTION

According to one aspect, a monitoring system comprises: a detecting device configured to detect at least one of smoke and heat; an alarm in operable communication with the detecting device, wherein the alarm is configured to notify a user after the detecting device detects at least one of smoke and heat; a sensing structure configured to determine whether a heating apparatus has a temperature that is above a threshold; and a processor in operable communication with the sensing structure and at least one of the detecting device and the alarm, the processor configured to at least one of: a) turn off at least one of the alarm and the detecting device; and b) reduce the sensitivity of the detecting device, when the sensing structure determines that the heating apparatus has a temperature that is above a threshold.

According to another aspect, a method of monitoring a room comprises: detecting, by a detecting device, at least one of smoke and heat; determining, by a sensing structure, that a heating apparatus has a temperature that is above a threshold; in response to the determining that the heating apparatus has a temperature that is above a threshold, performing, by a processor, at least one of: a) turning off at least one of an alarm and the detecting device; and b) reducing the sensitivity of the detecting device; and notifying, with the alarm, a user after the detecting at least one of smoke and heat, if the sensing structure determines that the heating apparatus has a temperature that is below the threshold.

According to yet another aspect, a monitoring system comprises: a detecting device configured to detect at least one of smoke and heat; an alarm in operable communication with the detecting device, wherein the alarm is configured to notify a user after the detecting device detects at least one of smoke and heat; a sensing structure configured to determine whether a cooking apparatus has a temperature that is above a threshold; and a processor in operable communication with the sensing structure and at least one of the detecting device and the alarm, the processor and the sensing structure configured to prevent the alarm from notifying the user as a result of smoke or heat from a cooking apparatus.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

A detailed description of the hereinafter described embodiments of the disclosed apparatus and method are presented herein by way of exemplification and not limitation with reference to the Figures.

Figure 1:
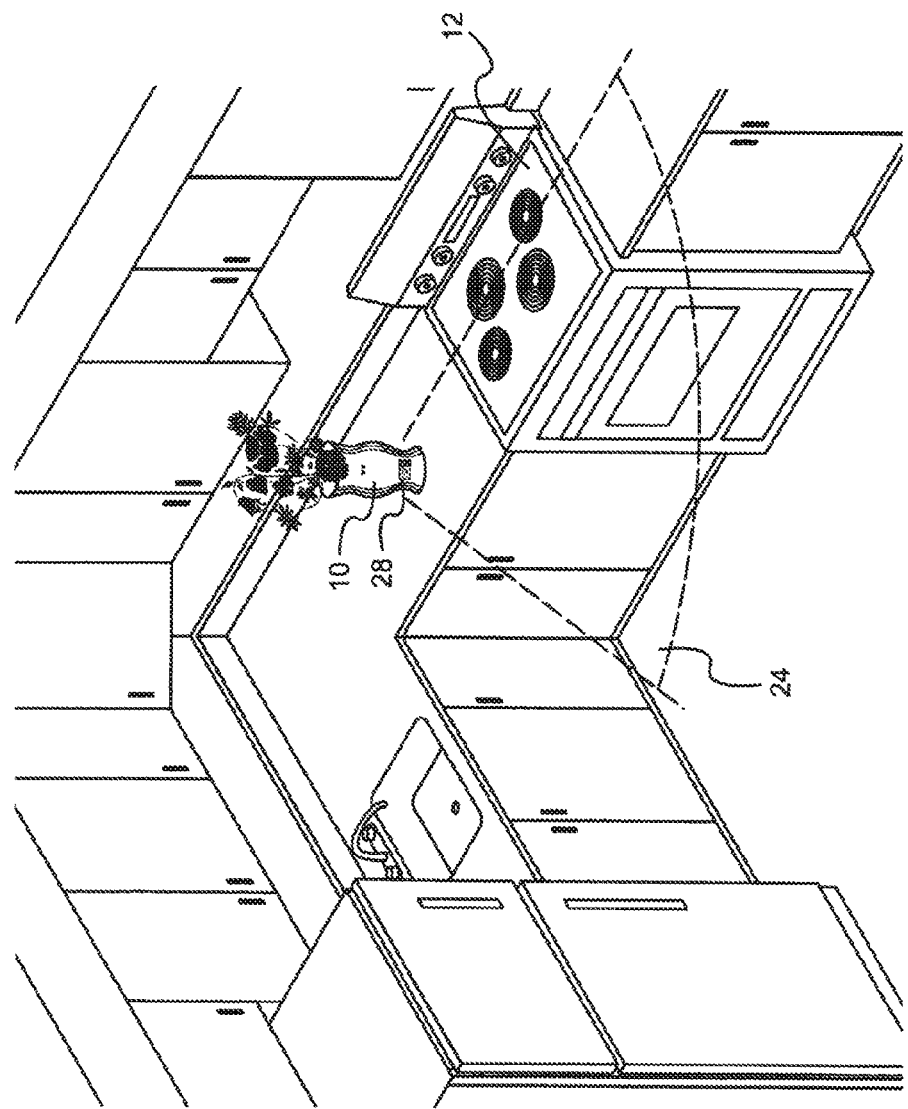
FIG. 1 depicts a perspective view of a device located on a countertop in proximity of a stove top in accordance with one embodiment.
Figure 2:
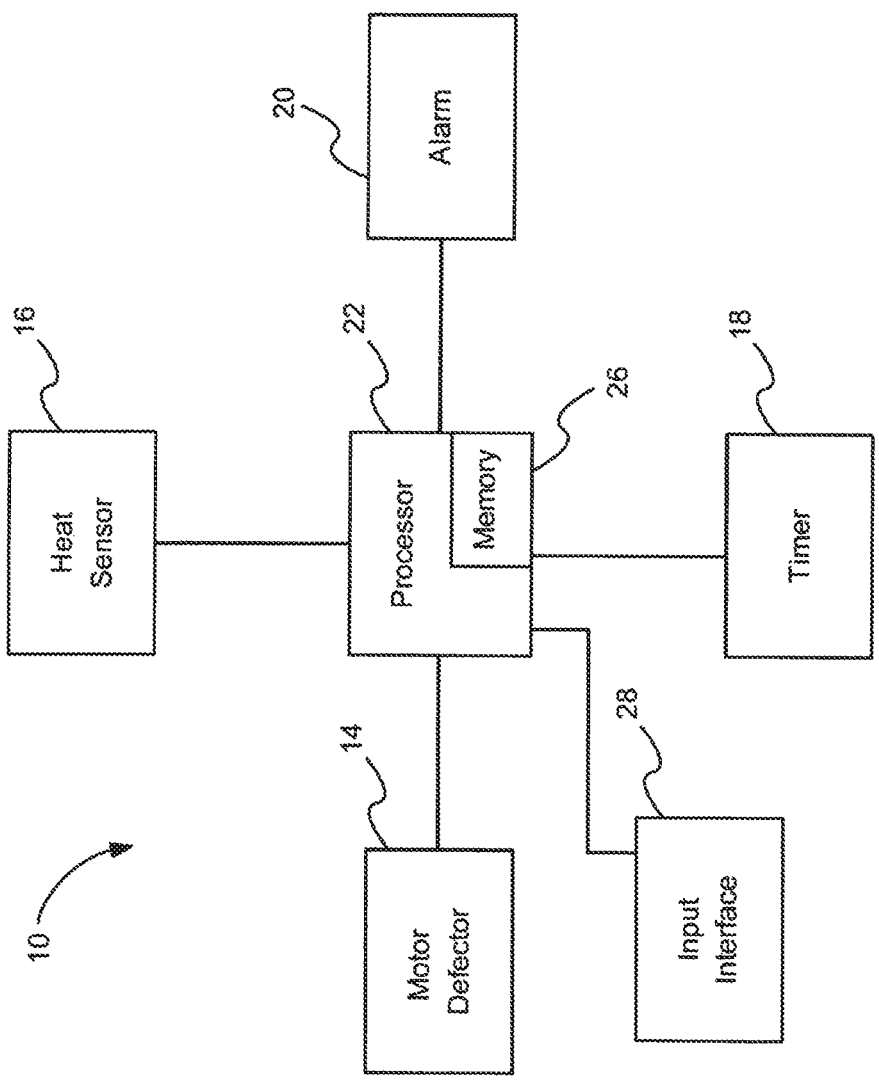
FIG. 2 depicts a schematic view of the device for monitoring the heating appliance of FIG. 1 in accordance with one embodiment.
Figure 3:
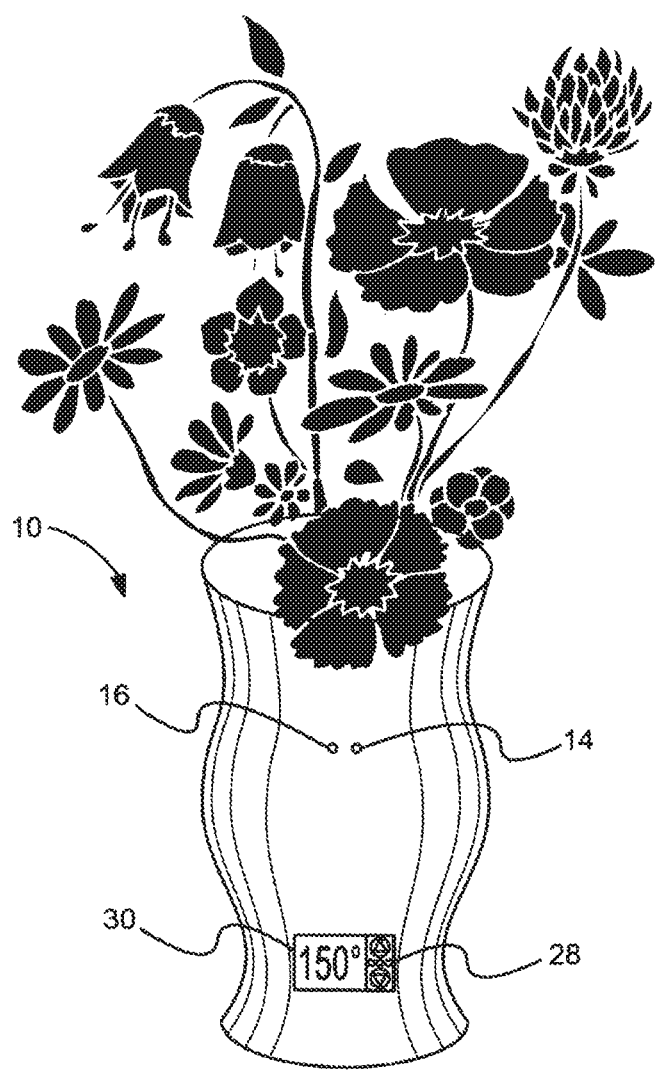
FIG. 3 depicts a perspective view of the device of FIG. 1 in accordance with one embodiment.

Referring firstly to FIGS. 1-3, there is shown a device 10 for monitoring a heating apparatus 12. While the heating apparatus 12 may be a stove as shown in FIG. 1, other heating apparatuses are contemplated. For example, it should be understood that the device 10 may be configured to monitor ovens, grills, fryers, or the like. The device 10 may be encased into a typical kitchen apparatus, such as flower vase as shown in the Figures. However, other kitchen apparatuses are contemplated such as spice racks, knife holders, utensils, clocks, coffee makers, tea pots, or the like. It should be understood that any apparatus that would typically be used, or look natural, on a countertop is contemplated. Alternately, the device 10 may be hangable from a ceiling. In this embodiment, the device 10 may be integrated into a hanging light or fan, for example. Furthermore, the device 10 may simply be attachable or integrated into the heating appliance 12 itself. The device 10 includes a motion detector 14, a heat sensor 16, a timer 18, an alarm 20, and a processor 22 that work in conjunction to alert a user that the heating appliance 12 has been left unattended. The device 10 is placeable in the proximity of the heating apparatus 12 such that the heat sensor 16 is able to detect the temperature of the heating appliance 12 and the motion detector 14 is able to detect movement in a proximity area 24 of the heating appliance 12. It should be understood that embodiments of the device 10 may be battery powered, solar powered, or may be plugged in to an outlet.

The motion detector 14 may further be deactivated by default. This may be advantageous in order to conserve energy that is used by the device 10 or battery life of the device 10. The motion detector 14 may be an infrared sensor, or any type of sensor that is able to detect whether a user is in the proximity of the heating apparatus 12. The motion detector 14 may be particularly configured to detect motion only in an area 24 proximate the heating appliance 12. Thus, the motion detector 14 may be able to detect that a user has walked by or maintaining a presence at the heating appliance 12 and is presumably aware of the temperature and heating state of the heating appliance 12. The motion detector 14 may be able to distinguish this proximate motion at the heating appliance 12 with other movements that occur at farther distances from the heating appliance 12. This is because movement occurring too far from the heating appliance 12 may not indicate that the user is currently aware of the temperature and heating state of the heating appliance 12. In one embodiment, the motion detector 14 may simply not be able to detect motion that occurs at a location that is farther than a predetermined distance. Alternately, the processor 22 may be able to distinguish this proximate movement from the movement occurring at a predetermined distance from the heating appliance 12. Furthermore, the motion detector 14 may be able to distinguish the height at which the movement occurs. The motion detector 14 may be configured to not detect motion that is below a certain height so that the device 10 can distinguish between children and adults in the vicinity of the heating appliance 12. Alternately, the motion detector 14 can sense motion at any height and the processor 22 may distinguish that motion of a certain height means that a user is currently aware of the heating appliance 12. While the embodiment depicted includes a single motion detector 14, it may be beneficial to include a plurality of motion detectors. For example, a plurality of motion detectors 14 may be able to detect in a broader area of space around the proximity of the heating apparatus 12.

Like the motion detector 14, the heat sensor 16 may also be deactivated by default. Again, this may be advantageous in order to conserve energy that is used by the device 10 or battery life of the device 10. The heat sensor 16 may be an infrared sensor, or any other sensor known to those skilled in the art that can make an exact or approximate determination of the temperature of an object or the amount of heat radiating from an object. In one embodiment, the heat sensor 16 and the motion detector 14 may be the same sensor. Thus, the heat sensor 16 may also detect motion in the vicinity of the heating apparatus 12. However, in the embodiment depicted, the device 10 includes two separate sensors 14, 16 to motion and heat respectively. While the embodiment depicted includes a single heat sensor 16, it may further be beneficial to include a plurality of each of these detection mechanisms. For example, a plurality of heat sensors 16 may be able to detect in a broader area of space.

The timer 18 may be configured to cyclically repeat a first countdown. At the end of the first countdown, the heat sensor 16 may be activated temporarily in order to sense heat being emitted from the heating apparatus 12. The period of the first countdown may be, for example, 10 minutes. Other periods are contemplated. For example, the period of the first countdown may be between five minutes and thirty minutes. The period of the first countdown should be set such that the heating apparatus 12 may be on for this length of time without being hazardous. The timer 18 is configured to perform a second countdown when the activated heat sensor 16 determines that the heating apparatus 12 is on. The second countdown may have the same period as the first countdown, or a different period, depending on the embodiment. When the second countdown is being performed, the motion detector 14 may be activated. When motion is detected, the second countdown may be reset such that the period must be re-counted. This resetting may continue each time motion is detected by the motion detector 14. However, if the second countdown reaches the end without any detected motion, the alarm 20 may be configured to notify a user that the heating apparatus 12 is left unattended.

It should be understood that the alarm 20 may be an audible alarm. Thus, the device 10 may include one or more speakers so that the alarm is loud enough to alert a user that may be in another room from the heating appliance 12. The audible waves of the alarm may have a frequency and amplitude of a typical fire alarm. However, other embodiments are contemplated. For example, the alarm 20 may also be a visual alarm. This may be particularly beneficial when a user is hearing impaired. Of course, the alarm 20 may include both audible and visual components. Furthermore, the device 10 may send a signal to an off-site remote alarm (not shown) in addition to the integrated alarm 20. The off-site alarm may be an alarm similar to the alarm 20 in another room of the house than the room that the device 10 is in. For example, the device may send a signal to an off-site alarm in a study or living room. Furthermore, the off-site remote alarm may signal to a user that is located completely out of the house that the heating apparatus 12 is located. For example, the device 10 may be configured to automatically notify a user's cell phone, computer, telephone or any other device. In the case that the device 10 contacts a user's cell phone to alarm the user, the user may be required to download an application that allows for communication with the device 10 in order to alarm the user in a similar manner to the alarm 20 as described herein above.

Furthermore, the timer 18 may be configured to stop the second countdown and revert back to the initial first countdown when the heat sensor 16 determines that the temperature is back below the threshold. Thus, the heat sensor 16 may be active during the second countdown, either continuously or temporarily at intervals. Furthermore, even if the heat sensor 16 determines that the temperature is above the threshold, the timer 18 may be configured to stop the second countdown and revert back to the first countdown when the heat sensor 16 determines that the temperature of the heating apparatus 12 is steadily declining. This may signal to the device 10 or the processor 22 that the heating appliance 12 is turned off and may prevent the alarm 20 from inadvertently notifying a user in such a situation.

Shown in FIG. 2 is a schematic view of the device 10 including the motion detector 14, the heat sensor 16, the timer 18, the alarm 20 and the processor 22. Any or all of the motion detector 14, the heat sensor 16, the timer 18, the alarm 20 and the processor 22 may be located within the housing of the device 10. As shown, the operations of the timer 18 in conjunction with the heat sensor 14, the motion detector 16, and the alarm 20, as described hereinabove, may be controlled and directed by the processor 22. It should further be understood that the device 10 may also include memory 26 that is connected to the processor 22 for storing the programming to perform the functions described hereinabove. Alternately or in addition to the memory 26, the device 10 may also be controlled through firmware that is embedded into the device 10 or the processor 22.

Referring more specifically to FIG. 3, the device 10 may include an input interface 28. The input interface 28 may allow a user to change the period of least one of the first countdown and the second countdown. Thus, the input interface 28 may include a user display 30 for displaying the settings to the user. The input interface 28 may be a simple toggle that provides for the shortening or extension of either or both of the countdowns. For example, the user interface 28 includes up and down arrows for increasing or decreasing the numerical value inputs. Other functions of the device 10 may also be altered by a user through the input interface 28. For example, the threshold temperatures described hereinabove may also be toggled. Thus, low simmering temperatures may be prevented from triggering the device 10 from entering into the second countdown. The input interface 28 may or may not include an on/off switch for the device 10. In one embodiment, for example, there may not be an on/off switch for the device 10 because the device 10 is always in an "on" state as long as it is plugged in, has charged batteries, or is otherwise powered. In this "on" state there may be no way to deactivate the device 10, other than unplugging, removing batteries, or otherwise unpowering the device 10. Furthermore, this "on" state should not be meant to imply that the heat sensor 16 and the motion detector 14 are always "on" but rather that the internal timer 18 is performing its countdowns and turning the heat sensor 16 and the motion detector 14 "on" at various intervals as described herein.

Figure 4:
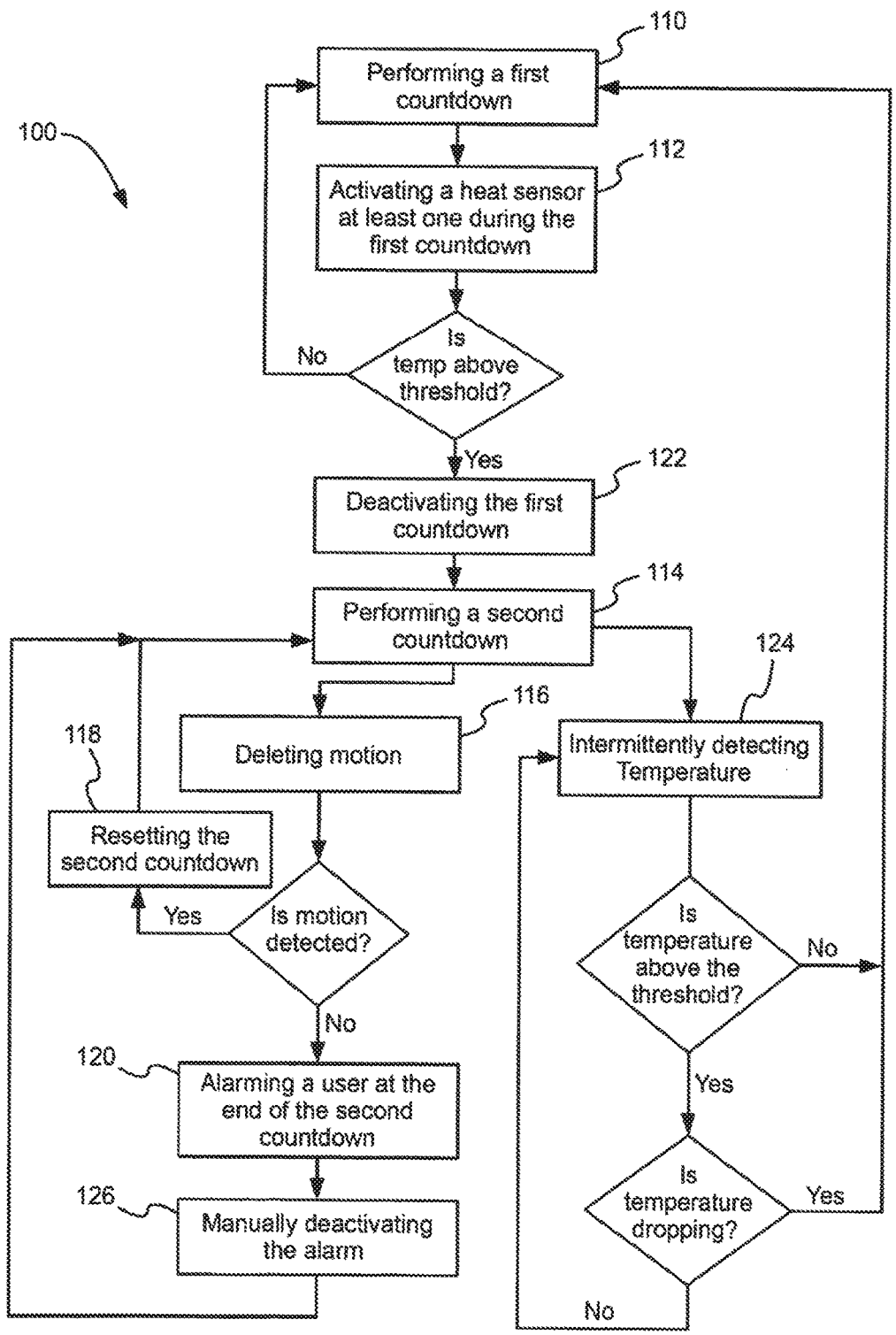
FIG. 4 depicts a flow diagram of a method for monitoring a heating appliance in accordance with one embodiment.

Referring now to FIG. 4, a flow diagram of a method 100 for monitoring a heating appliance, such as the heating appliance 12, is shown. The method 100 first includes a step 110 of performing a first countdown of a first set period with a timer, such as the timer 18. The method 100 then includes a step 112 of activating a heat sensor, such as the heat sensor 14, once during each of the repeated first countdowns. The heat sensor may be configured to determine whether the heating apparatus has a temperature that is above a threshold. If the heat sensor determines that the heat is below the threshold, the first countdown is repeated. If the heat sensor determines that the heat is above the threshold, the method 100 may then proceed to a step 114 of performing a second countdown of a second set period with the timer.

During the second countdown, the method 100 includes a step 116 detecting motion with a motion sensor, such as the motion sensor 16, when the heat sensor determines that the heating apparatus has a temperature that is above the threshold. Next, the method 100 includes a step 118 of resetting the second countdown when motion is detected by the motion sensor. The method 100 then involves a step 120 of alarming a user when the timer reaches the end of the second countdown. It should be understood that the method 100 may further include providing a single device for housing the heat sensor, the timer, the motion sensor and the alarm. Further, the method 100 may include a step 126 of manually deactivating the alarm by a user. The method 100 may further include a step 122 of deactivating the first countdown of the timer when the timer is performing the second countdown.

Furthermore, the method 100 may include a step 124 of intermittently detecting the temperature of the heating apparatus with the heat sensor during the second countdown. It should be understood that the intermittent temperature detection may have the same countdown period as the first countdown period. Further, the intermittent detecting step 124 may be being performed by the method 100 during the detecting motion step 116 during the second countdown. Furthermore, the method 100 may include a step 126 of reverting back to the first countdown if it is determined that either: (1) the temperature is below the threshold; or (2) that the temperature is decreasing, as described hereinabove. If the temperature remains above the threshold and the temperature is not dropping, the step of intermittently detecting temperature 124 may continue.

Figure 5:
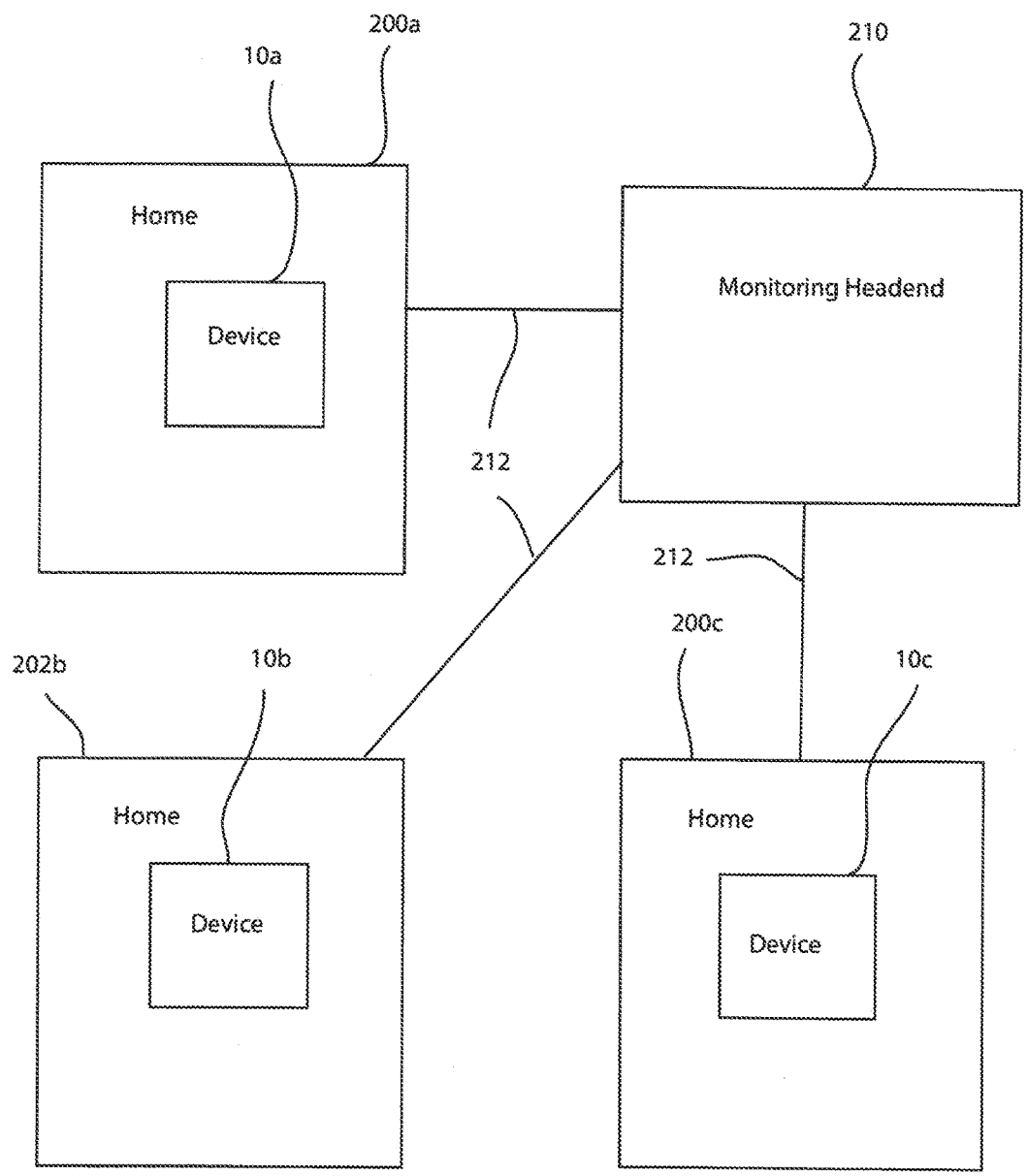
FIG. 5 depicts a schematic view of a system including a device and monitoring headend in accordance with one embodiment.

Referring now to FIG. 5, in another embodiment, the device 10 may be configured to send information to a remote location such as a monitoring headend 210. In this embodiment, the device 10 may be located in a user's home 200. The monitoring headend 210 may not be located within the user's home 200, but rather may be located off site and connected via a network 212. The monitoring headend 210 may provide for monitoring of multiple devices 10 such as a first device 10a, a second device 10b, and a third device 10c located in a first home 200a, a second home 200b, and a third home 200c. The monitoring head end 210 may thus be connected to any number of the devices 10 located in any number of homes 200. The monitoring headend 210 may be a service provided by the manufacturer or distributor of the device 10. A single monitoring headend 210 may monitor hundreds or thousands of devices 10 simultaneously. The monitoring headend 210 may be configured to both receive information from the device 10, but may also send information back to the devices 10, or other systems found in the home 200, such as alarm systems, doorbells, telephones, mobile phones, televisions, or the like. Moreover, the monitoring headend 210 may be configured to send a signal to the device 10 in order to operate the device 10. For example, the monitoring headed 210 may be configured to turn on the device 10 at a user or homeowner's request. The monitoring headend 210 may be configured to turn on the motion sensor of the device 10 in order to allow the device to see if a person was in the vicinity of the stove in real time, or to see if a cook was there recently, or to monitor for how long there has been no movement in the vicinity of the device 10. The monitoring headend 210 may further store any information provided by the device 10 in a database which can be accessed by a user at a later time.

It should further be understood that the device 10 may actually be a system, rather than a single device with a single housing. In other words, the system may include a separate alarm component, motion detector component, heat detector component, smoke detector component, carbon detector component, processor, data storage location, and the like. These components may be separate components that are located at various locations in a room or house to optimize functionality of the system. Thus, when "the device" is referred to here, it should be understood that a single device, or a multi-component system are contemplated.

The monitoring headend 210 may further be a video monitoring system or service. In this embodiment, the expiration of the second countdown and the activation of the alarm may alert the monitoring headend 210 in order to do a video search of the relevant room, i.e. kitchen, to determine if there is a fire or other dangerous situation. The monitoring headed 210 may respond accordingly, should such a situation be present.

In one embodiment, the device 10 may actually include an attached camera. The camera may be viewable remotely from a cell phone, through a wireless Wi-Fi system or hard wired security system. This camera could provide the installer with a means of ensuring that the device 10 was facing the proper direction for ensuring motion will be properly detected. The camera and video information could also be accessible by the headed 210.

Thus, the device 10 may be configured to both send and receive data signals and information. The device 10 may be a full duplex communication system, or may alternately be a half-duplex communication system. Because of the capabilities of the device 10 to both receive and send data signals, the device may be remotely controllable via blue tooth, radio, an internet link, a cell phone, a satellite, or other remove media. Moreover, the device 10 may further be configured to store data or information at a remove server, or internally within the device, for later collection in applications which are accessible via computers, tablets, laptops, mobile communicators (cell phones), and the like.

In assisted living situations, it should be understood that the monitoring headend 210 may be a central monitoring station in an assisted living facility. In this way, the assisted living facility may monitor the status of the device 10, and would know when the alarm was sounded due to the expiration of the second countdown with no movement. In this embodiment, the staff members of the assisted living facility could check in on the room as soon as the alarm information was provided to the monitoring headed 210 of the assisted living facility.

In other embodiments, the computing power of the device 10 may be found in the cloud. In other words, the device 10 may be set up to wirelessly connect to a local wireless network. Once connected, the device 10 may be configured to interact with the cloud in order to reduce the computational power required from the device 10. For example, the determination of when to alarm or notify a user may be made by calculations occurring at a remote location or server, such as at the monitoring headend 210. The device 10 may not need to be equipped to perform such calculations or algorithms.

The device 10 may further use Wi-Fi to communicate with other household devices in range. For example, the device 10 may further communicate with a home alarm system. This may allow the device 10 to sound an alarm in other locations of the house if the conditions for the alarm have been met, as described hereinabove. For example, if the internal timer reaches end of the second countdown, the device 10 may be configured to sound a local alarm directly from a speaker in the device 10, but additionally the device 10 may communicate with other alarms found in various other locations of the home to also sound the alarm. The device 10 may further be configured to set off alarms or warnings in a hierarchy or order. For example, upon the second countdown expiring with no movement in the vicinity, the device 10 may be configured to sound the local alarm. If, after a predetermined time (i.e. one or more minutes), no movement is found proximate the device 10, the device 10 may set an alarm in other rooms of the house. Next, if there is still no movement after a predetermined amount of time, the device 10 may call a pre-programmed cell phone or telephone number of a user. This call may be pre-recorded with an automated reminder message. Finally, if there is no movement after another set amount of time, the device may contact the authorities, or may contact the monitoring headend 210. It should be understood that this is just one example of a hierarchical order which ascends in intrusiveness as the time progresses. The hierarchy may further include a single alarm becoming increasingly louder, or otherwise intrusive, as time goes on.

Figure 6:
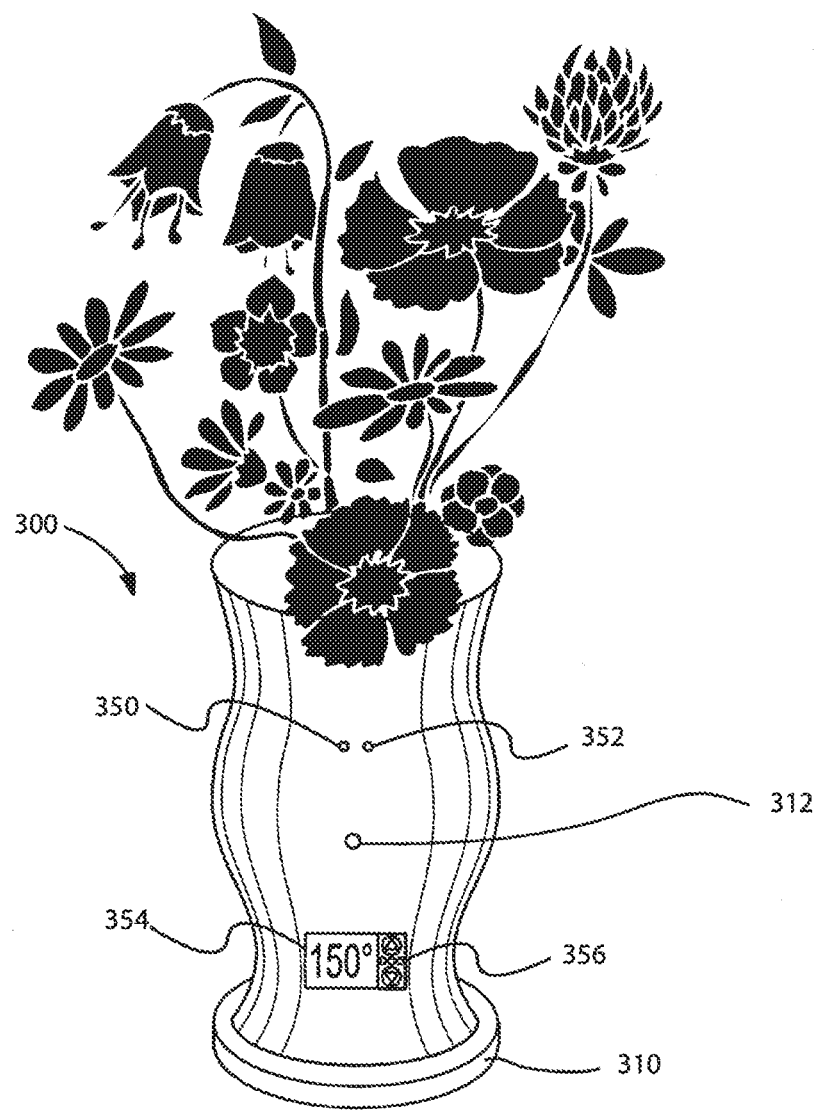
FIG. 6 depicts a perspective view of a device located on a countertop in proximity of a stove top in accordance with one embodiment.

Another embodiment of a device 300 is shown in FIG. 6. The device 300 may be similar to the device 10 in all respects. Thus, the device 300 may, for example, include a heat sensor 350, a motion detector 352, a user display 354, and an input interface 356. The device 300 may further include a processor (not shown). However, the device 300 may further include a base 310. The base 310 may be a stationary element which is adhered, bolted, or otherwise permanently attached to a countertop, wall or ceiling. The base 310 may include a keyed opening or bore such that the device 300 may be insertable into the keyed opening or bore to rest therein. Because the opening or bore is keyed, the device 300 may be specifically insertable into the opening in a single position such that it is always pointed in the direction of the stove. Therefore, the device 300 is prevented from being replaced into the base 310 in an incorrect position or facing an incorrect direction. The base 310 may include a charger, in one embodiment. This may allow a user to remove the device 300 from the base 310 in order to clean the device 300 or otherwise service the device 300, and then replace the device consistently in the proper orientation, position, and direction for monitoring.

Still further, the device 300 may include a laser pointer 312 or beam. The laser pointer 312 or beam may be configured to shine a laser in the direction that the device 300 motion sensors are pointing to indicate to a user how to orient the device 300 to ensure the motion sense is pointed in the proper direction. This laser may shine either as a direct point, or may shine in an area, where the area is the area that the device 300 is able to detect motion within, for example. The same laser or a second laser (not shown) may be utilized in order to determine the direction in which the heat sensor is pointed, or even a smoke sensor. In another embodiment, the device 300 may not include a motion sensor integrated within. Rather, the device 300 may communicate wirelessly with a different motion sensor that was set at a different location in a room, or a different room altogether. This may enable the system to get a better view of the area that is being detected. The motion sensor may even be part of a security system installed in the home. In this way, the device 300 may be an integral component to a home security system.

In one embodiment, the device 10, 300 may include temperature adjustments in order for a user to set a particular temperature below which the device 10, 300 may not be configured to alarm the user. For example, if a user was cooking a stew all day at a low temperature, the device 10, 300 may be set to refrain from entering into the internal timer sequence. Likewise, time may also be adjustable. In this embodiment, the time of the first and second countdowns may be set by the user. Additionally, the time may revert back to default settings after a cooking session finishes. Thus, if a user sets the timer to 20 minutes once to slow cook a particular meal, the next time the user attempts to cook again, the slow set timer will not remain. This may prevent settings being adjusted for dangerously long times.

In one embodiment, the device 10, 300 may be configured to call an owner's mobile communicator, cell phone, telephone, or other device to notify the user that the battery of the device 10, 300 is running low. Alternately, this telephonic communication may notify the user that the device 10, 300 has not detected movement despite the heat of the stove or oven being on for the set period of time. Rather than sending a telephonic communication, the device 10, 300 may instead send out a communicating signal to a home system in order to wirelessly shut off a gas valve to the stove or to the house itself. In the same way, the device 10, 300 may send a signal which cuts electricity to the stove or oven, or turns off the power of the stove or oven.

In a further embodiment, the device 10, 300 may include a smoke and carbon detector (such as carbon dioxide and/or carbon monoxide). These detectors may, for example, be default disabled and may be activated as part of a hierarchy of alarms, as described hereinabove. If the device 10, 300 detects the absence of motion during the second countdown, the device 10, 300 may turn on a smoke alarm and/or carbon alarm. These additional alarms may look for a proof of fire and respond accordingly. For example, the device 10, 300 may sound an alarm if fire was detected or contact the monitoring headed 210 or other appropriate authority. The smoke detector and carbon detector may further be included in the hierarchy of alarms which are enabled the longer the device 10, 300 remains without detecting movement. Still further, the device 10, 300 may be in operable communication with the HVAC system of a household. The device 10, 300 may send a controlling signal to the HVAC system if smoke, carbon dioxide or carbon monoxide is detected. This signal may be sent, for example, via blue tooth or over Wi-Fi or via a wired connection. The signal may be configured to stop the fan operations of the HVAC system in order to prevent the spread of dangerous gases in the household.

Motion detected by the motion detector 352 may not be configured to shut off the alarm in all cases. For example, in one embodiment, if the alarm has been sounding for a set elongated length of time, the detection of motion will not impact the alarm. Thus, if the alarm has been sounding for this set elongated length of time, the alarm may be required to be reset manually, rather than simply by the detection of motion. This may prevent the device 300 from detecting motion in the form of smoke to turn off the alarm. Smoke may appear increasingly like movement to the motion detector 352 the more invasive it pervades a room. As such, this feature should prevent the device 300 from turning off the alarm when there is simply a lot of smoke being detected. In other embodiments, the device 300 may otherwise detect the difference between human motion and smoke motion. It should be understood that these features may be applied to any of the devices described herein.

In still another embodiment, alarm information may be sent from the device 10, 300 to an insurance carrier. In this embodiment, the purchase of the device 10, 300 may reduce a homeowner's premium due to the safety the device 10, 300 provides for the home. However, the reduced premium may be subject to monitoring by the insurance companies to make sure any unsafe activity does not occur, or does not occur frequently.

The device 10, 300 may further sound an alarm when the device 10, 300 needs to be cleaned. For example, the device 10, 300 may be able to sense when the motion monitoring lens is covered or dirty. The alarm may be a different alarm than the notification alarm that occurs when the device 10, 300 reaches the end of the second countdown. The cleaning alarm may also be activated when a predetermined amount of time has passed since the most recent cleaning.

Figure 7:
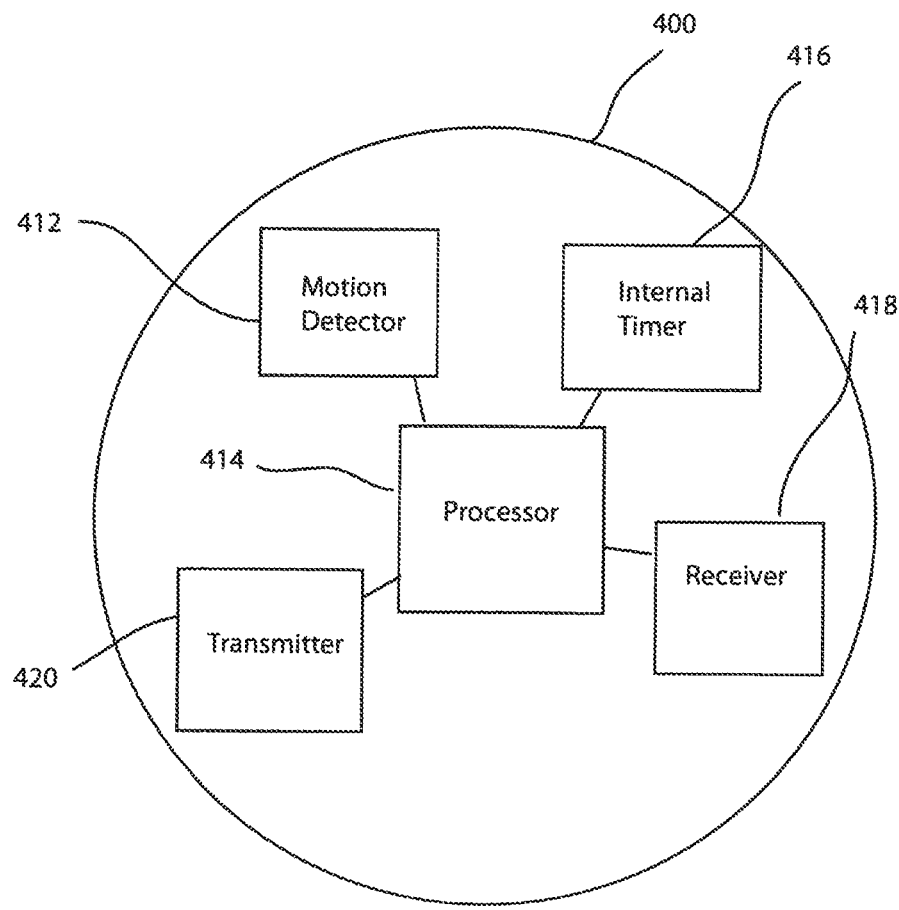
FIG. 7 depicts a schematic view of a device in accordance with one embodiment.

In FIG. 7, another embodiment of a device 400 is shown. In this embodiment, the functionality described hereinabove is incorporated into a wall or ceiling mounted smoke alarm 400. Alternately, in this embodiment, the functionality above may be incorporated in a device which is mountable on a ceiling in a similar manner to a ceiling amounted smoke alarm, as described herein. In one embodiment, the smoke alarm device or smoke detector 400 may be either an ionization or a photoelectric smoke alarm, for example. In this embodiment, the smoke alarm device 400 may include a motion detector 412, a processor 414, and an internal timer 416 as described hereinabove. Further, the device 400 may include a receiver 418 and a transmitter 420 for sending and receiving signals to other outside devices such as the monitoring headend 210. Thus, it should be understood that any of the devices 10, 300, 400 described herein may be attachable to the wall, ceiling, countertop, or the like.

In an embodiment where the device 400 is configured to be attachable to a ceiling, the device 400 may be controllable by a separate handheld controller (not shown), remote or "clicker." The controller may be configured to utilize a user interface which may adjust the timer for the alarm, and the temperature parameters. In some embodiments, the handheld controller may be configured to move the direction that the motion detector 412 is facing, or the direction in which the heat sensor or smoke detector is facing. Thus, the motion detector 412, heat sensor, and smoke detector components may actually be a movable component within the housing of the rest of the device 400. For example, the motion detector may be a circular lens resembling an eyeball, which is configured to rotate based on an input from the controller or other user interface. It should be understood that this movable motion detector 412 may be applied to any of the embodiments of devices described herein.

Still further, components of the systems described herein may be separate from each other. For example, the heat sensor may be located in a component which is located near the stove. The motion detector may, for example, be located across the room from the heat sensor and the stove in order to give the best movement reading for the house or room in question. The alarm may be located on the ceiling next to or within a smoke or carbon alarm. Still further, some or all of the components of the device 10, 300, 400 may be located within a stove or oven. In this way, the device 10, 300, 400 may be integrated into the cook top control panel.

Figure 8:
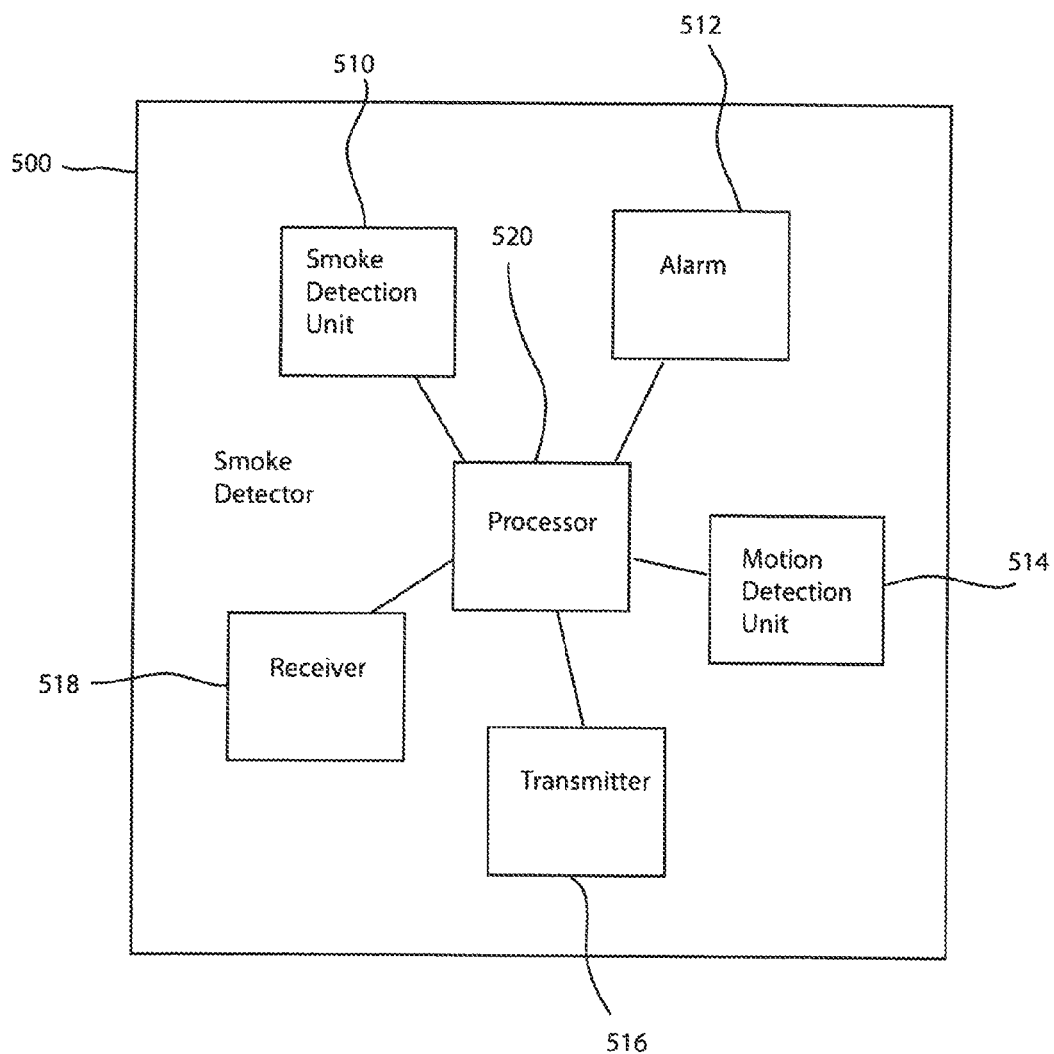
FIG. 8 depicts a schematic view of a device in accordance with one embodiment.

In yet another embodiment, a smoke detector or smoke alarm device 500 is contemplated as shown in FIG. 8. The smoke detector 500 may include a smoke detection unit 510, an alarm 512, a motion detection unit 514, a transmitter 516 and a receiver 518. Each of these components may be in operable (either wired and/or wireless) communication with a processor 520. In practice, the smoke detector 500 may include a countdown mechanism on the timer in a similar manner described hereinabove with the device 10. The smoke detector 500 may therefore prevent the alarm 512 from sounding even if smoke was detected by the smoke detection unit 510 if movement was determined to be present in the vicinity of the smoke by the motion detector unit 514. In this embodiment, no countdown may exist. Rather, the smoke detector 500 may simply first send an immediate inquiry to the motion detection unit 514 as to whether there is motion in the vicinity of the smoke detector 500, when smoke is present. The smoke detector 500 may then refrain from sounding the alarm. The smoke detector 500 may further have a heat sensor unit 520 therein which may be pointed at the oven or stove. This heat sensor 520 may help the smoke detector 500 from determining a situation that was a real fire, versus a situation where the oven or stove was creating harmless cooking smoke. Thus, if a heat sensor 520 detects cooking level heat coming from the stove while the smoke detection unit 510 detects smoke, the motion sensing unit 514 may be initialized to sense motion. However, if there is no heat sensed from the oven or stove, the smoke detector 500 may sound the alarm 512 whether or not motion is sensed by the motion detector unit 514. This may prevent the smoke detector 500 from failing to sound an alarm in the case of a real fire even if motion was present. This is because not all motion may result in actual awareness of a fire, such as if a child or baby was moving around in a room where a fire was starting. Still further, if cooking smoke and movement are each detected by the smoke detector 500 but the movement later stops, a countdown may be enacted. Upon reaching the end of the countdown with no further movement, the smoke alarm 500 may sound the alarm. This countdown may, for example, be a minute long.

In still another embodiment, the device 10, 300, 400, 500 may include additional timer capabilities. In the previously described embodiments, a timer would begin a countdown when a heat sensor detected a certain degree of heat. The countdown would be reset each time a motion detector detected movement. Additional timers may also be configured on the device 10, 300, 400, 500. For example, the first previously described timer may be configured with a certain time-length if the heat sensor senses head below a certain temperature. However, an additional timer may be included for a shorter time length if the heat sensor senses heat above the certain temperature. In this way, several timers may be set dependent on the heat that is detected. The greater the heat being detected, the less amount of time that the timer may count down from before an alarm is set.

Figure 9:
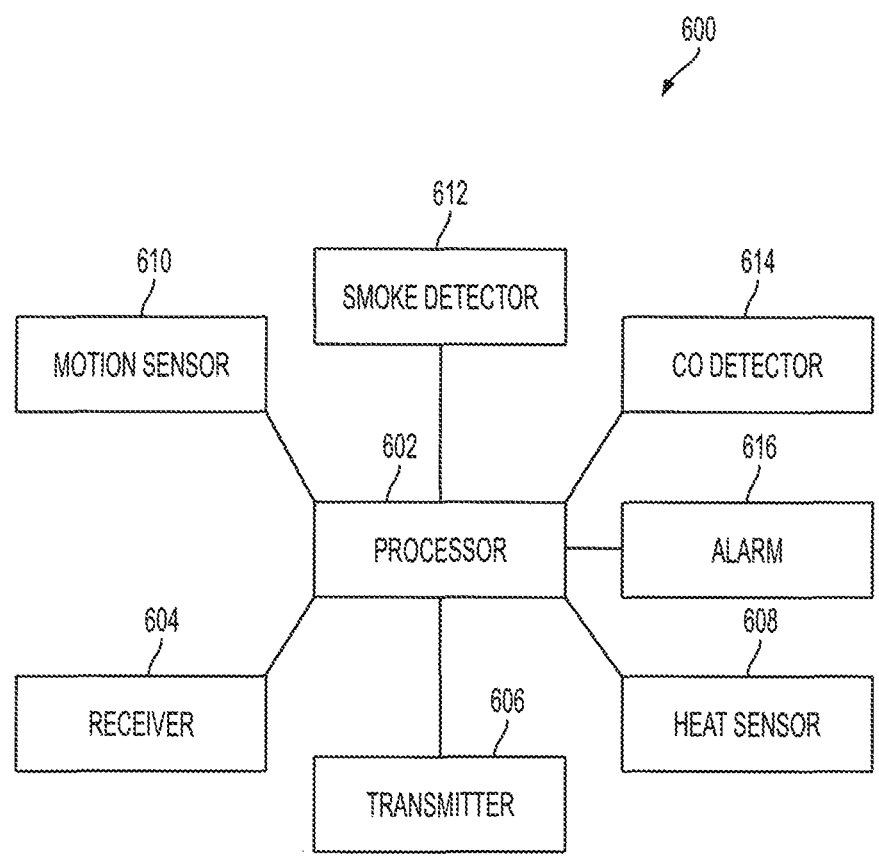
FIG. 9 depicts a schematic view of a device in accordance with another embodiment.

Referring now to FIG. 9, another device 600 is shown. The device 600 may include some or all of the capabilities, structure, and programming of the devices 10, 300, 400, 500 described hereinabove to the extent not inconsistent with the disclosure included hereinafter.

Figure 12:
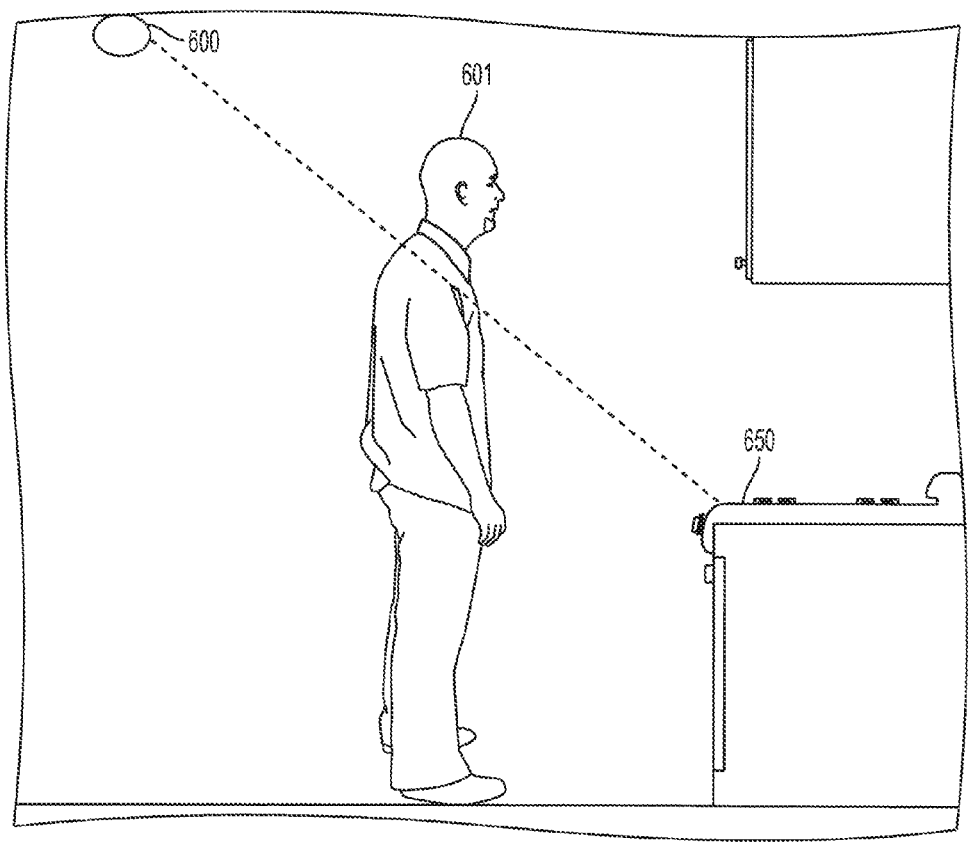
FIG. 12 depicts a perspective view of a the device of FIG. 9 installed in a ceiling in accordance with another embodiment.
Figure 13:
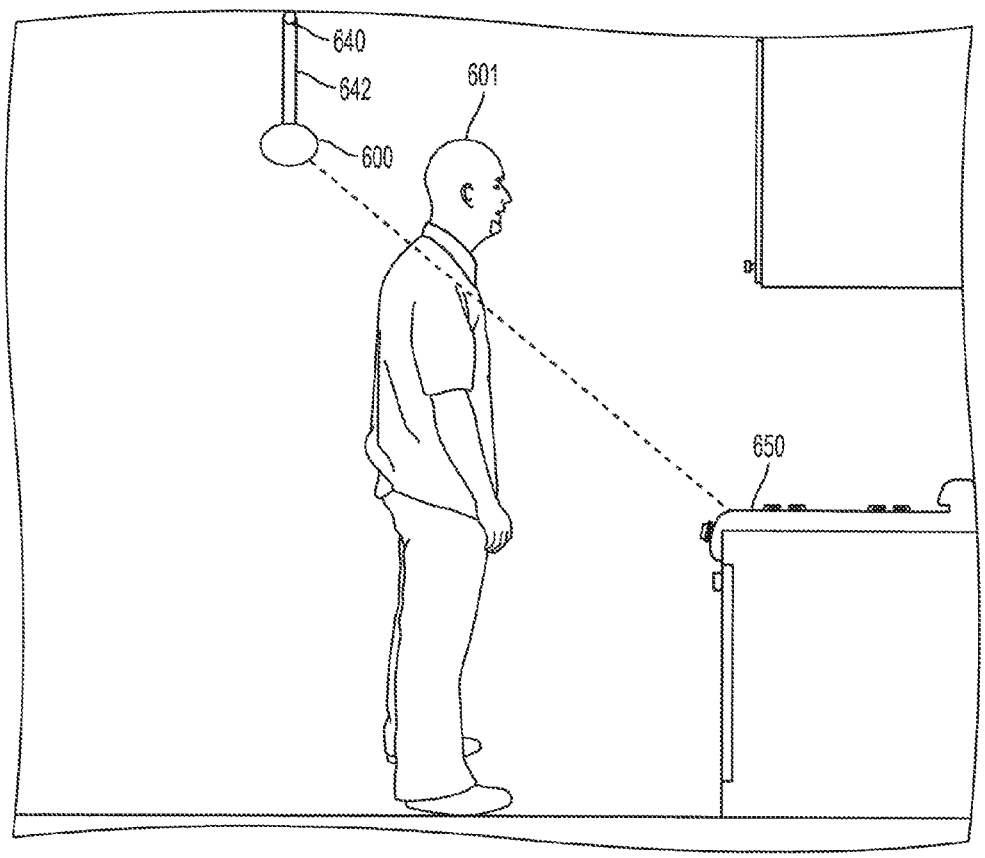
FIG. 13 depicts a perspective view of another embodiment of the device of FIG. 9 hanging from a ceiling in accordance with another embodiment.
Figure 14:
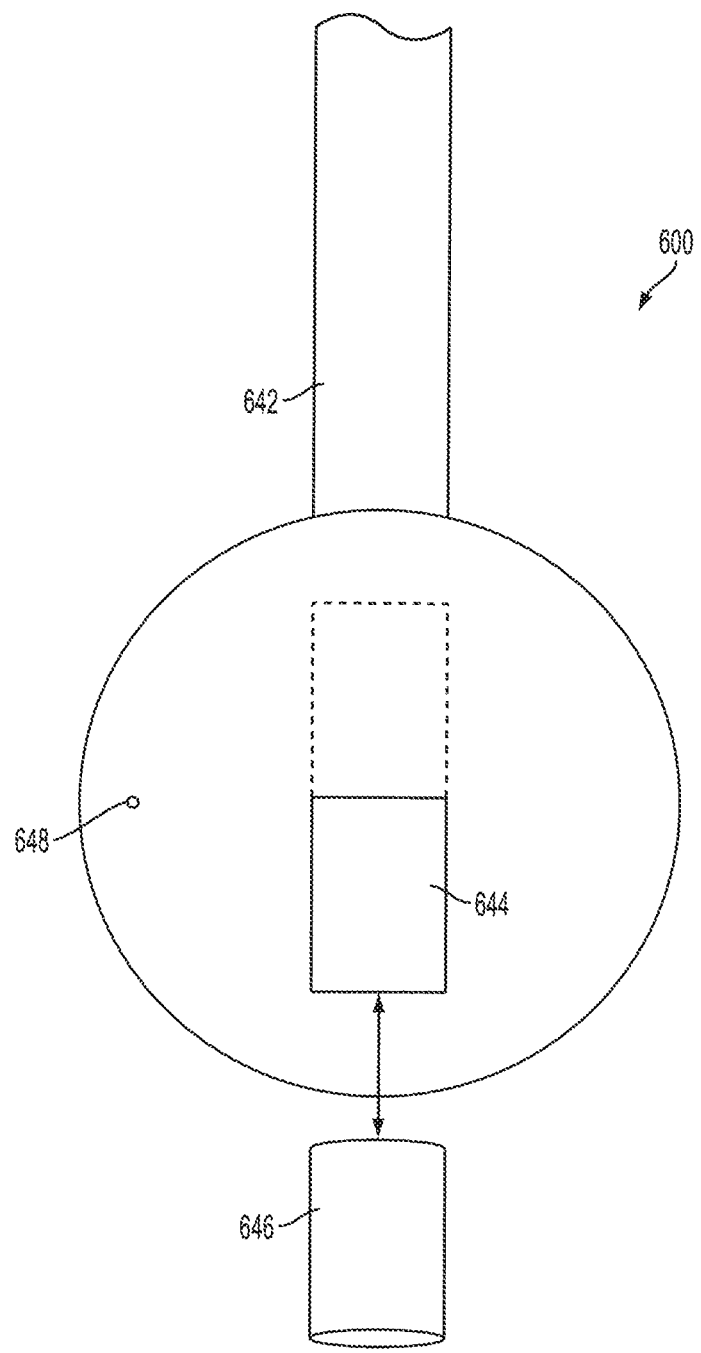
FIG. 14 depicts a perspective view of the device of FIG. 9 in accordance with another embodiment.

The device 600 may include some or all of a processor 602, a receiver 604, a transmitter 606, a heat sensor 608, a motion detector 610, a smoke detector 612, a carbon detector 614, and an alarm 616. It should be understood that each of these elements 602, 604, 606, 608, 610, 612, 614, 616 may include one or more component parts which make up the entirety of element to be described herein below. Further, each of these elements 602, 604, 606, 608, 610, 612, 614, 616 may be housed within a single device housing, as shown in FIGS. 12-14. In other embodiments, the elements 602, 604, 606, 608, 610, 612, 614, 616 may be dispersed between a number of separately housed devices which may, in combination, comprise a detection or alarm system. Moreover, hereinafter the motion detector 610, smoke detector 612, carbon detector 614, and heat sensor 608 may each be referred to, individually, or collectively, as a sensing structure. Thus, hereinafter, "sensing structure" may include one or more of these elements 608, 610, 612, 614, but is not limited to these elements and may include any element that is configured to sense a condition from the environment external to the device 600. Still further, while the smoke detector 612 and the carbon monoxide detector 614 may be referred to as "detectors," it should be understood that these may be referred to as "alarms" and may each be a standalone device having its own separate alarm component. In this embodiment, the separate devices 612, 614 may be in communication with an external processor 602 which may be included as part of a separate unit within a heating device monitoring structure. Thus, the smoke detector 612 and carbon monoxide detector 614 may be standard alarms with an additional transmitter and/or receiver for communicating information to the external processor 602.

The sensing structure of the device 600 may be configured to determine whether a person is proximate a heating apparatus 650, as shown in FIGS. 12 and 13. In one embodiment, the motion detector 610 may actually be the same element as the heat sensor 608. In one embodiment the heat sensor 608 may be, for example, an infrared sensor. The heat sensor 608 may be pointed directly at the heating apparatus 650 in a manner that a person working proximate the heating apparatus 650 would walk between the heating apparatus 650 and the device 600 or the heat sensor 608. In this embodiment, the heat sensor 608 may be configured to detect motion proximate the heating apparatus 650 by monitoring the heat proximate the heating apparatus 650 and determining whether there is an immediate temperature drop as a result of a person walking between the heat sensor 608 and the heating apparatus 650. Thus, if a person walks between the heat sensor 608 of the device 600 and the heating device 650, the device 600 may translate this temperature drop as representative of motion proximate the heating apparatus 650. Moreover, it should also be understood that an extremely fast, or instantaneous increase in temperature could result in the determination that the person is or was proximate the heating device 650. Thus, one or both of these parameters (the very fast or instantaneous increase or decrease in temperature sensed by the heat sensor 608) may be used to sense motion. In one embodiment, the sensing of motion may accomplished by other motion sensing systems as described hereinabove, such as by a more conventional motion detector 610. Whatever the embodiment, the detection of motion may reset alarm countdowns as described hereinabove with respect to the devices 10, 300, 400, 500.

In an additional embodiment, the heat sensor 608 components of the device 600 may further include an additional sensor of capability of the heat sensor 608 which is configured to monitor the temperature of the ceiling, or a portion of the ceiling, of the room in which the device 600 is fixed within. This monitoring may help facilitate the determination by the processor 602 whether there is danger of a fire.

It should be understood that the heat sensor 608 may be a thermistor, a bi-metal sensor, an infrared sensor, a thermal sensor, or the like.

In addition to determining whether a person is proximate the heating apparatus 650, the sensing structure may further be configured to determine whether the heating apparatus 650 has a temperature that is above a threshold. Once again, this may be accomplished by the heat sensor 608. Similar to the previous embodiments described herein, the processor 602 may be in operable communication with the sensing structure (608, 610, etc.) and may be configured to cyclically repeat a first countdown. One or more components of the sensing structure may be temporarily activated once during each of the repeated first countdowns. The processor 602 may be configured to perform a second countdown when the activated sensing structure determines that the heating apparatus has the temperature that is above the threshold.

Alternatively or additionally, the processor 602 may be configured to perform the second countdown when the activated sensing structure determines that the heating apparatus has a temperature that is increasing at a rate greater than a threshold. In this embodiment, a fast increase in temperature at the location of the heating device 650 may result in the determination, by the processor 602, that the heating device 650 is activated. Moreover combinations of logic are contemplated whereby the processor looks at a combination of factors, including the rate of change of the increase in temperature, along with the current temperature, for determining whether to begin performing the second countdown. It should be understood that any logic combination of these two parameters for determining when to begin the second countdown, is contemplated.

The second countdown may be reset each time the sensing structure determines that a person is proximate the heating apparatus 650. Furthermore, the alarm 616 may be configured to notify a user when the processor 602 reaches the end of the second countdown. This resetting step and this alarm step may be accomplished in similar manners to that described hereinabove with respect to the devices 10, 300, 400, 500.

The device 600 may further include the smoke detector 612 and the carbon monoxide detector 614. In one embodiment, one or both of the smoke detector 612 and the carbon monoxide detector 614 may be turned off or placed in a silent mode by the processor 602 when the sensing structure determines that the heating apparatus has the temperature that is above the threshold or the change of temperature is increasing at a rate greater than a predetermined rate. The turning off of the smoke detector 612 and/or the carbon monoxide detector 614 may also be placing these components 612, 614 into a stand by mode or a dormant mode. One or both of the smoke detector 612 and the carbon monoxide detector 614 likewise may be turned on by the processor 602 when the sensing structure determines that the heating apparatus 650 has the temperature that is below the threshold or when the device otherwise determines that the heating device 650 is no longer in use. This functionality may allow the device 100 to take over for the smoke detector 612 when the sensing structure determines that the heating device 650 is on. This may allow for the heating device to be monitored by the device 100 without unnecessary alarms being set and sounded as a result of harmless smoke from the heating device 650. Because the functionality of the device 100 may be configured to safely notify and sound the alarm in the event of a true emergency, the standard functionality of the smoke detector 612 component may not be necessary at the time that the device is operational in detecting movement proximate the heating device 650 during the use of the heating device 650.

In one embodiment, one or both of the smoke detector 612 and the carbon monoxide detector 614 may be configured to enter a cooking mode when the sensing mechanism determines that the heating device 650 has the temperature above the threshold or the temperature of the heating device 650 has been increasing a rate greater than a threshold rate. When entered into the cooking mode by the smoke detector 612 and the carbon monoxide detector 614, the threshold for triggering the alarm 616, or another alarm that may be triggered by the smoke detector 612 and the carbon monoxide detector 614 (in the event that these detectors 612, 614 are standalone devices distinct from the stove monitoring features of the device 100) may be increased. Thus, in the event that the heating appliances 650 is in use, the smoke alarm 612 and the carbon monoxide alarm 614 may be less sensitive and therefore less likely to go off, thereby preventing false alarms because of harmless cooking smoke or heat. In other embodiments, if the heating device 650 is hot or heating up, and the device 600 detects movement at the heating device 650 in any manner described herein, this detection may be processed by the processor 602 which may thereafter send a "hush" or "silent" signal to the smoke detector 612 or the carbon monoxide detector 614 for a predetermined period of time, such as for the amount of time provided in the second countdown. It should further be understood that the smoke detector 612 and the carbon monoxide detector 614 may be partially disabled when the heating appliance 650 is determined to be on by the device 600. For example, only the speaker of the alarm 616 may be disabled. Alternately, the photo detector or ionization chamber of the device 600 may be disabled in other embodiments.

In embodiments when the device 600 takes over, or causes smoke detector and carbon monoxide detector functionality to enter a sleep mode, or less sensitive state, the smoke detector 612 and the carbon monoxide detector 614 may each be fully reactivated when the device 600 determines that the heating appliance 650 is no longer in use (based on the temperature and/or change of temperature detection due to temperature decreases). However, in other embodiments, the smoke detector 612 and the carbon monoxide detector 614 may be reactivated only after a predetermined period of time has passed after the device 600 determines that the heating appliance 650 is no longer turned on. This delay may prevent false alarms due to lingering cooking smoke in the air after cooking.

It should further be understood that the smoke detector 612 and the carbon monoxide detector 614 may be integrated into the device 600 or may be separate devices included in the same system, as described herein below and shown in FIG. 10. Whatever the embodiment, these detectors 612, 614 may work together in detecting a dangerous situation. For example, in one embodiment, the detection of smoke without high carbon monoxide levels may simply imply normal cooking, whereas a true fire may trigger high levels of both smoke and carbon monoxide.

In accordance with embodiments described hereinabove, the device 600 may not continually monitor for whether the heating appliance 650 is turned on to begin cooking. Rather, the device may only check once every few minutes, for example, to see whether a device has had a temperature change. Thus, it is possible that the heating appliance 650 is turned on immediately after the device 600 has checked for a temperature change. This could result in a situation where the smoke detector 612 and the carbon monoxide detector 614 are not yet placed into a sleep mode or a stand by mode or other less active mode. This could result in a false alarm state caused by harmless cooking smoke, for example. In order to prevent this, if the smoke detector 612 or the carbon monoxide detector 614 pick up any activity or increase in levels, the device 600 may immediately enter an active mode thereby instantly triggering another check of the temperature of the heating device 650. In another embodiment, this exact situation could trigger a soft alarm, whereby the device 600 is configured to let a user or cook know to step away from the heating device 650 in order allow the device 600 to get an accurate reading on whether the heating device 650 is in use.

In additional embodiments, it should be understood that the device 600 may be configured to simultaneously monitor, in the manners described herein and with respect to the devices 10, 300, 400, 500, more than one heating appliance, such as the heating device 650. For example, in industrial kitchens, or in houses having a plurality of kitchens or heating appliances, a single device may be centrally located in a room and may be configured to monitor each of the heating appliances. Alternately, a plurality of devices 600 may each include separate and distinct sensing structures. In one embodiment, a single processor 602 may be located centrally, and may be in communication with each of the plurality of devices 600 having the respective sensing structures. This processor may perform the same functionality as described hereinabove. In other embodiments, each of the plurality of devices may be autonomous and each may include its own separate processor 602 for performing the functionality described herein.

In another embodiment, the processor 602 may be configured to turn on the heat sensor 608 to take an instantaneous, or single look at the heating appliance 650. If the heating appliance 650 is determined to be on using the various logic inquiries described hereinabove, a timer may be started by the processor. During this second timer, the motion detector 610 may actually not be activated. The motion detection 610 may simply be activated at the end of the second timer. At the end of the second timer, the motion detector 610 may be activated for another single instantaneous look. If there is motion detected, the timer may reset, and the motion detector 610 goes back to the inactive state until the end of the timer once again reactivates it to check for motion. If motion is not detected, the alarm 616 may sound. This may conserve battery life by keeping the motion detector 610 functionality inactive for a longer period such that the motion detector 610 is not constantly active.

Figure 10:
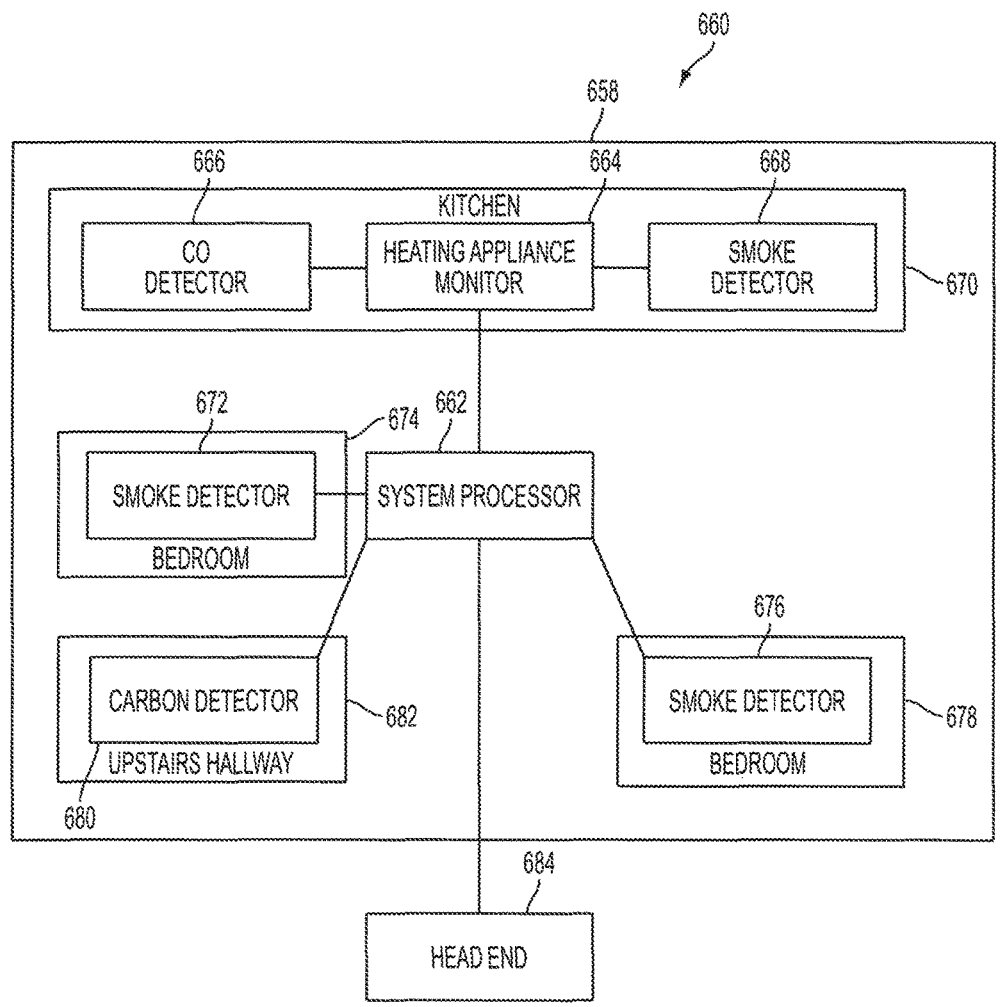
FIG. 10 depicts a schematic view of a system in accordance with another embodiment.

Referring now to FIG. 10, a system 660 is shown. The system 660 includes a system processor 662 located at an unspecified location in a dwelling 658. The system 660 includes a heating appliance monitor 664, a smoke detector 666, a carbon monoxide detector 668 located in a kitchen room 670. The system 660 further includes a second smoke detector 672 located in a first bedroom 674 and a third smoke detector 676 located in a second bedroom 678. The system further includes a second carbon detector 680 located in a second story hallway 682. Finally, the system 660 may be connected to a manufacturer's head end 684 located outside the dwelling. The system processor 662 may be connected to the head end 684 over the internet or via a direct network connection. Moreover, the system processor 662 may be connected to the head end 684 over a cellular network as well.

In this embodiment, a single system processor 662 may be located in a dwelling for controlling multiple separate devices having their own sensing functionality and/or alarm functionality. In the embodiment shown, the kitchen 670 may include three separate devices: the smoke detector 666, the appliance monitor 664, and the carbon detector 668. It should be understood that the combination of these three devices 666, 664, 668, along with the system processor 662, may perform the same functionality as described herein with respect to the device 600. Thus, the stove monitor 664, for example, may include a motion sensor, heat sensor, transmitter, receiver, processor, and alarm similar to the motion sensor 610, heat sensor 608, alarm 616, receiver 604, transmitter 606 and processor 602. The smoke detector 666 may include a smoke detector along with an alarm, a transmitter, and a receiver, along with an optional processor. Likewise, the carbon detector 668 may include a carbon detector, an alarm, a transmitter, a receiver, and an optional processor. These standalone devices 666, 664, 668 may communicate back and forth with the processor 662 to perform the same function as described hereinabove. In one embodiment, the processor 662 may actually be located in the heating appliance monitor 664. In one system embodiment, the heating appliance monitor 664 may include the only processor in the entire system. In the system embodiment, the processor 662 may be in communication with a head end 684 located off site. The head end 684 may be at an alarm or home monitoring company, or manufacturer of one or more of the devices in the system, which collects and analyzes the data received by the system processor 662. In one embodiment, the head end 684 may be a cellular device. It should be understood that various embodiments of systems including a heating appliance monitor 664 having some or all of the features and functionality of the devices 10, 300, 400, 500, 600 described herein are contemplated. Moreover, the head end 684 may further be sent duplicate signals to show that one or more of the devices in the system were triggered into an alarm state. Moreover, the head end 684 may be configured to receive information as to when a device in the system is in a low battery state. This data may be collected by the head end 684, and may allow the head end 684 to send communications to the owners of the protected dwelling if necessary. It should be understood that the system 660 may only send signals to the head end 684 in an escalated situation (e.g. when an alarm is triggered multiple times in a short time period, or if a device is determined to be fully out of batteries). In other embodiments, the head end 684 may simply receive every piece of data collected by the processor 662.

Figure 11:
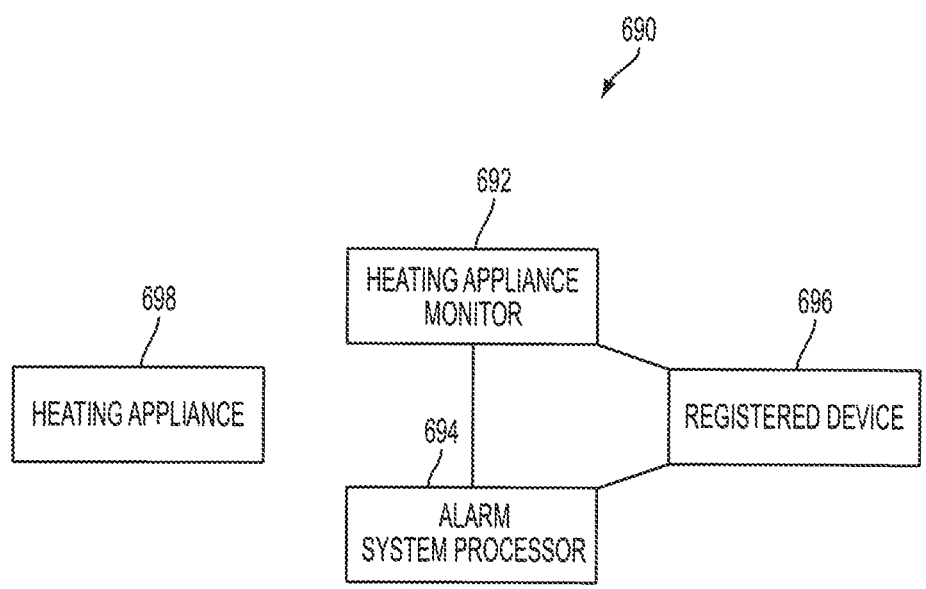
FIG. 11 depicts a schematic view of a system in accordance with another embodiment.

Referring now to FIG. 11, a registration system 690 is shown including a heating appliance monitor 692, an alarm system processor 694 and a registered device 696, and a heating appliance 698. In this embodiment, it is contemplated that the registration system 690 may be configured to register the registered device 696, such as the personal mobile communicator 696, to the system. The system 690 may include a transmitter in operable communication with the processor that is configured to send a message to the personal mobile communicator 696 as the personal mobile communicator 696, for example, leaves a predetermined proximity distance from the heating appliance 698. It should be understood that the heating appliance monitor 692 in this embodiment may include any or all of the functionality of the devices 10, 300, 400, 500, 600 described hereinabove. The system processor 694 may be an internal processor of the device 692, or may be a separate processor as described hereinabove with respect to the embodiment shown in FIG. 10. Whatever the embodiment, the system may be able to determine if a phone or other communicator has left the vicinity of a heating appliance when the heating appliance is in a turned on state. In this embodiment, the registered device could receive a call or, for example, a text message, asking the registered device if they are the cook. If, for example, this is answered in the negative, the system 690 may unregister the registered device. However, multiple devices may be registered into the system 690 simultaneously. The system 690 may be configured to utilize the GPS system found in the registered devices 696, such as cell phones, to determine if the registered device leaves the vicinity of the heating appliance 698. This may help to prevent users from leaving a dwelling if the heating appliance monitor 692 determines that the heating appliance 698 is active and hot.

Referring now to FIG. 12, a perspective view of a room is shown having the device 600 installed in the ceiling. In particular, the device 600 is shown attached to the ceiling above, but in front of the heating device 650. Thus, the device 600 is particularly located in the room such that the person 601 cooking will be located between the device 600 and the heating device 650.

Referring to FIG. 13, another perspective view of another room is shown having the device 600 installed in the ceiling with a base component 640. Extending from the base component 640 is an elongated element or arm 642. The arm 642 may be telescopic in one embodiment. The arm 642 may be hingedly attached to the base component 640 with full rotational freedom such that the arm 640 is capable of always extending directly downward, for example, when the base is attached to a slanted ceiling. Additionally, the telescopic nature of the arm 642 may be configured to allow the device 600 to hang from the perfect height above the heating appliance 650 such that the sensors in the device 600 can achieve maximum accuracy.

Referring now to FIG. 14, a close up view of the device 600 is shown. In this embodiment, the device 600 is spherical in shape. However, it should be understood that other shapes and sizes are contemplated. Furthermore, the device 600 is shown including a recess or cavity 644. The recess 644 may be configured to receive a laser pointer element 646. This laser pointer element 646, when input into the cavity 644, may be configured to point directly in a direction of one or more of the sensors of the device 600. This laser pointer element 646 may be carried around by an installer of the device 600 so that a single laser pointer element 646 can be used to properly install multiple devices 600 in multiple homes. Moreover, the device 600 may be configured to rotate about the elongated element or arm 642 such that the device 600 can be properly calibrated so that it faces the proper direction upon installation.

In other embodiments, the removable laser pointer element 646 may be integrated into the device itself as a permanent component of the device. The device may further include a button 648 for, in the case that the laser is an integral component to the device 600, activating the laser.

Figure 15:
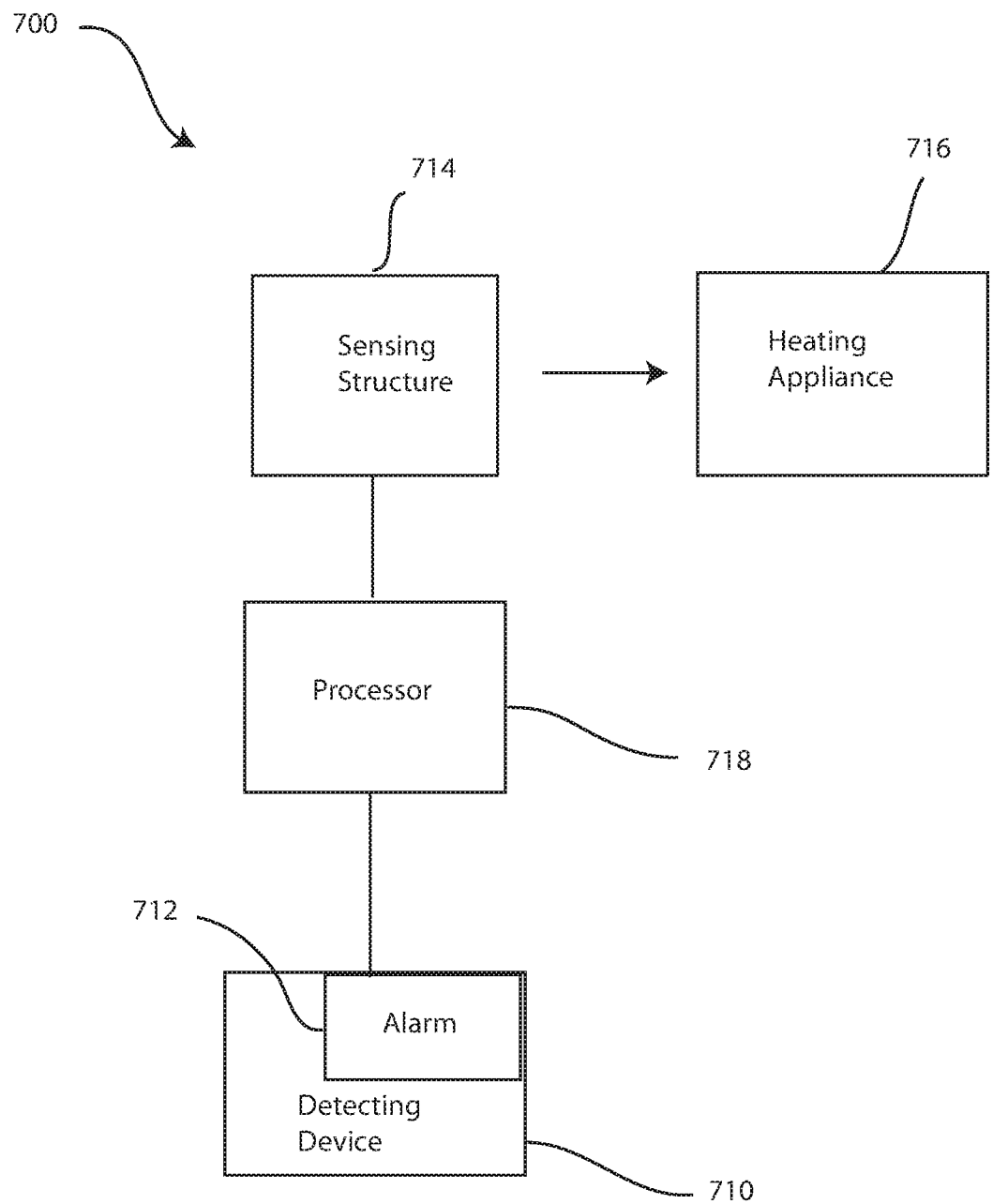
FIG. 15 depicts a schematic view of another system in accordance with another embodiment.

Referring now to FIG. 15, a monitoring system 700 is shown in accordance with another embodiment. The monitoring system 700 may include a detecting device 710 configured to detect at least one of smoke and heat. The monitoring system 700 may include an alarm 712 in operable communication, or otherwise communicatively connected to the detecting device. The alarm 712 may be configured to notify a user (not shown) after the detecting device 710 detects at least one of smoke and heat. The monitoring system 700 may further include a sensing structure 714 configured to determine whether a heating apparatus 716 has a temperature that is above a threshold. A processor 718 may further be in operable communication or otherwise communicatively connected to the sensing structure 714 and one or both of the detecting device 710 and the alarm 712.

The monitoring system 700 may include some or all of the features, capabilities, structure and programming in the systems and devices described hereinabove to the extent these previously described features, capabilities, structure and programming are not inconsistent with the disclosure included hereinafter.

The detecting device 710 may be a smoke detector or a smoke alarm in one embodiment. In other embodiment, the detecting device 710 may detect rises in temperature instead of smoke. The alarm 712 may be an integral component that may be incorporated into the same housing as the detecting device 710 in one embodiment. In others, the alarm 712 may be a separate device relative to the detecting device 710 and may be located in a separate location or room as the detecting device 710. In the event that the alarm 712 is separated from the detecting device 710, the alarm 712 and the detecting device 710 may be communicatively connected so that detections made by the detecting device 710 may result in the alarm notifying a user by an audible or other notification.

The sensing structure 714 may further be incorporated into the same housing as the detecting device 710 and/or the alarm 712. In other embodiments, the sensing structure 714 is a completely separate device relative to the alarm 712 and/or the detecting device 710. For example, in the event that the detecting device 710 is a smoke alarm unit, the sensing structure 714 may be a separate device or component that is added to the system and may communicate with the processor 718 and/or the detecting device 710 through a wireless or wired connection. The sensing structure 714 may, for example, be an infrared sensor that may be configured to detect both heat and motion in the manner described hereinabove with respect to the motion detector 610. For example, the sensing structure 714 may be an infrared sensor that is configured to determine whether a person is proximate the heating apparatus 716 by sensing a temperature drop when the person walks between the sensing structure 714 and the heating apparatus 716 and the sensing structure 714 is spaced apart from the heating apparatus 716. The infrared sensor may further be configured to determine whether the heating apparatus 716 has the temperature that is above the threshold.

In other embodiments, the sensing structure 714 may include one or both of a separate heat sensor and a motion detector. As described hereinabove, the sensing structure 714 may be pointed at or otherwise monitoring a location proximate the heating apparatus 716. Thus, when the sensing structure 714 is separated from the detecting device 710 an/d or the alarm 712, the sensing structure 714 may remain proximate the heating apparatus 716 while one or more of the alarm 712 and the detecting device 710 may be located in a different room or location as the heating apparatus 716.

It should be understood that the processor 718 may be one or more processors located in one or more of the sensing structure 714, the alarm 712 and the detecting device 710. In other embodiments, the processor 718 may be a separate and distinct system processing device that may communicate with one, some or all of the sensing structure 714, the alarm 712, and the detecting device 710. The processor 718 may be a computer processor that includes memory, storage, and the like such that the processor 718 is configured to perform the functionality described herein.

The processor 718 may be configured to turn off at least one of the alarm 712 and the detecting device 710 when the sensing structure 714 determines that the heating apparatus 716 as a temperature that is above a threshold temperature. Alternatively, or additionally, the processor 718 may be configured to reduce the sensitivity of the detecting device 710 when the sensing structure 714 determines that the heating apparatus 716 has a temperature that is above a threshold. Thus, the processor 718 and the sensing structure 714 may be configured to prevent the alarm 712 from notifying a user or person as a result of smoke or heat resulting from the cooking apparatus 716.

For example, in one embodiment, the sensing structure 714 may be located proximate the heating apparatus 716. In this embodiment, the detecting device 710 and/or the alarm 712 may also be located proximate the heating apparatus 716. The detecting device 710, which may be a smoke alarm, may detect smoke. However, this smoke may be the result of a person cooking using the heating apparatus 716 and may not actually be the result of a dangerous situation. To determine if the smoke is because of a dangerous situation or because a person is cooking, the sensing structure 714 may determine that the heating device 716 is on or being used by the person for cooking. This may be accomplished by the sensing structure 714 monitoring the temperature of the heating device 716. This monitoring may occur only after the smoke has been detected by the detecting device 710, or may occur at regular intervals or continuously, independently from the operation of the detecting device 710. In other embodiments, the sensing structure 714 may be disabled by default and may only become enabled after the detecting device 710 detects at least one of smoke and heat in the manner described herein.

When the sensing structure 714 determines that the heating apparatus 716 is in use, the sensing structure 714 may provide this information to the processor 718. The sensing structure 714 may determine the temperature of the heating apparatus 716 by utilizing an infrared sensor and communicating the sensed information to the processor 718. After receiving information showing that the temperature of the heating device 716 is above a threshold temperature, the processor 718 may then provide an instruction to the detecting device 710 to cause the detecting device 710 to reduce the sensitivity of the detecting device 710 and/or alarm 712 at least temporarily until it is determined by the sensing structure 714 and the processor 718 that the heating apparatus 716 is no longer in use. Alternatively or additionally, the processor 718 may then provide an instruction to the detecting device 710 to cause the detecting device 710 to turn off the detecting device 710 or the alarm 712 at least temporarily until it is determined by the sensing structure 714 and the processor 718 that the heating apparatus 716 is no longer in use. The system 700 may thereby prevent false alarms with the detecting device 710 (smoke detector or smoke alarm) in the vicinity of the kitchen during cooking, but remain active in the event that a fire occurs in the kitchen or in the vicinity of the kitchen.

To facilitate the sensing structure 714 being able to determine whether the heating apparatus 716 has a temperature that is above a threshold, the alarm 712 may be configured to issue an unobtrusive notification immediately or after the detecting device 710 detects at least one of smoke and heat. This unobtrusive notification, for example, an audible beep, may indicate to a user that if they are standing between the sensing structure 714 and the heating apparatus 716, they should move out of the way for a short time to allow the sensing structure 714 to get a reading on the temperature of the heating apparatus 716.

In one embodiment, the processor 718 may provide instructions to at least one of the alarm 712 and the detecting device 710 to turn on or return to a normal sensitivity, in the case that the sensitivity was previously reduced as described hereinabove. This may occur after the sensing structure 714 and/or the processor 718 determines that the heating apparatus 716 that has a temperature that is below the threshold. In one embodiment, the increase in sensitivity or turning on of the alarm 712 and/or the detecting device 710 may be delayed for a predetermined period of time after it is determined that the heating apparatus 716 no longer has a temperature that is above the threshold temperature and instead has a temperature that is below the threshold temperature. This delay may prevent residual smoke from cooking from causing a false alarm.

In another embodiment, the sensing structure 714 may be an IR and/or UV sensor and may be configured to sense a rapid increase in UV (ultraviolet) energy and/or IR wavelengths. The processor 718 may be configured to activate at least one of the alarm 712 and a second alarm (not shown) immediately, even if was previously deactivated as a result of the previously described methodology, in the event that the sensing structure 714 senses a rapid increase in UV energy and/or IR wavelengths. This may allow the system to detect flash fires and quick bursts of energy that are not consistent with cooking situations, even if the heating apparatus 716 is in use and a person is cooking. It is further contemplated that the processor 718 may be configured to wait a predetermined period after the sensing structure 714 or IR sensor senses the rapid increase in UV energy and/or IR wavelengths before the processor 718 activates at least one of the alarm 712 and the second alarm.

After the processor 718 has deactivated the detecting device 710 and/or alarm 712 or reduced the sensitivity of the detecting device 710 and/or alarm 712 because it has been determined that the heating apparatus 716 has a temperature that is above a threshold temperature, the processor may be configured to perform a countdown. This countdown may be reset each time the sensing structure 714 determines that a person is proximate the heating apparatus 716 or otherwise present. If the sensing structure 714 is an IR sensor and determines that the person has walked between the sensing structure 714 and the heating apparatus 716, via the detection of a temperature drop due to the difference of the body temperature of the person and the hotter temperature of the heating apparatus 716, this may reset the countdown. If a predetermined period of time has passed, and the countdown falls to zero, without any movement being sensed by the sensing structure, the alarm 712 and/or detecting device 710 may be reactivated. Alternatively, the system 700 may simply be configured to sound the alarm immediately 712 if the person has been away from the heating apparatus 716 for so long that the system determines that it has been abandoned. Thus, the technology described hereinabove related to ensuring that a person is present while cooking is applicable to the system 700 as an additional mechanism for determining that an alarm is appropriate.

It should be understood that the sensing structure 714 and at least one of the alarm 712 and the detecting device 710, along with the processor 718 may be located in disparate locations and connected by a wireless or wired connection. It should be understood that the system 700 may include additional detecting devices, processors, sensing structures and alarms in order to perform the above described functionality. For example, a plurality of sensing structures 714 may each be configured to sense the state of a separate heating appliance. Further, multiple alarms may be interconnected to provide sufficient notification of dangerous situations. In one embodiment, the alarm 712 and detecting device 710 may be located outside of the room with the heating apparatus 716, while the sensing structure 714 may be located in the room with the heating apparatus 716. In other embodiments, a larger system is contemplated whereby a single processor receives information from a plurality of different rooms each having their own heating appliance.

Figure 16:
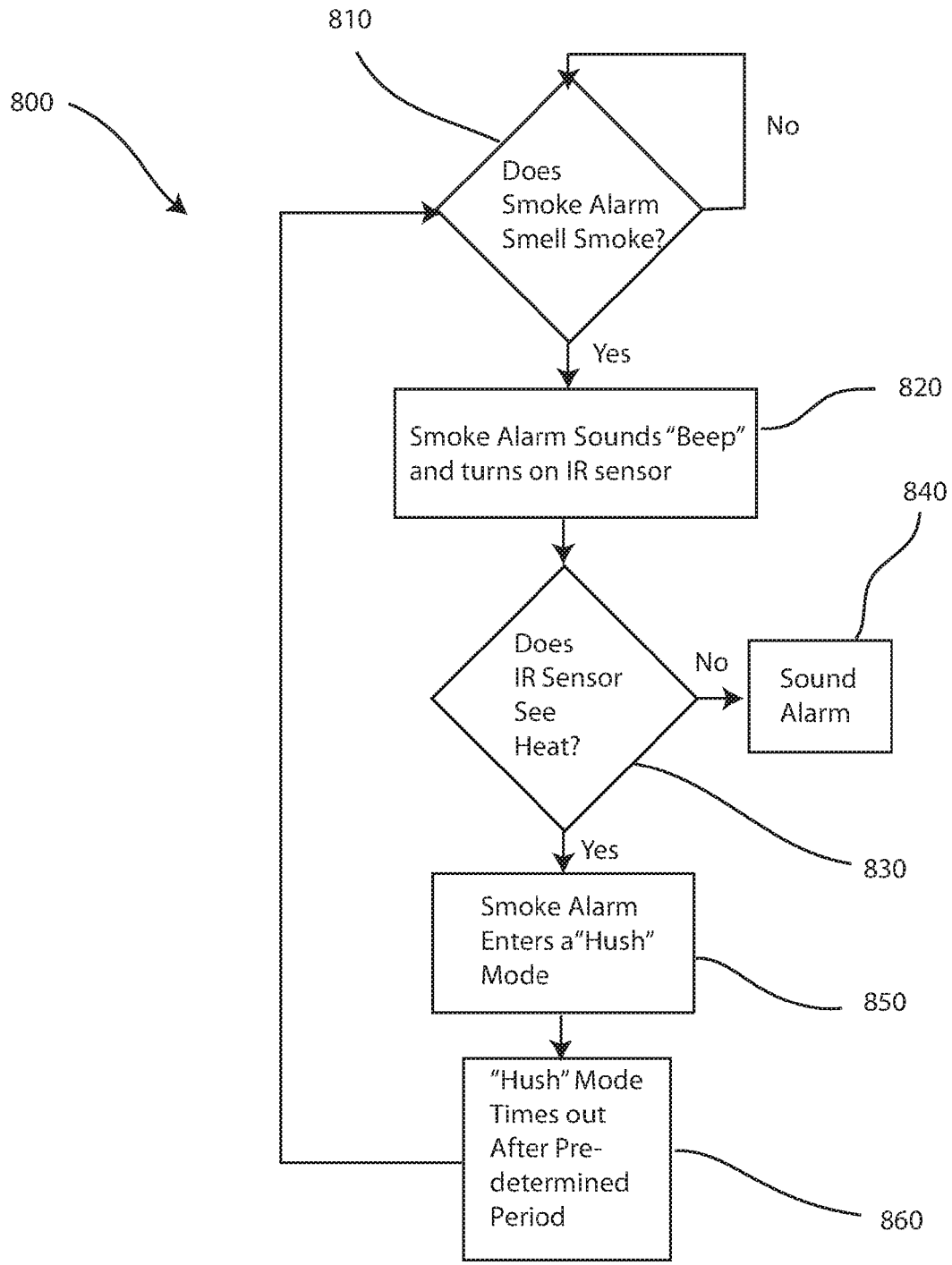
FIG. 16 depicts a flow diagram of a method for monitoring a room in accordance with one embodiment.

Referring now to FIG. 16, an exemplary flow diagram 800 is shown. The flow diagram includes a first step 810 of determining whether a smoke alarm, such as the alarm 712, senses smoke. If no, the smoke alarm continues to remain active. If yes, the flow diagram proceeds to a second step 820, whereby the smoke alarm sounds a "beep" and turns on an IR sensor, such as the sensing structure 714. A next step 830 determines whether the IR sensor sees heat at a location of a heating appliance within a short time period after the warning "beep" sounds. If no, a step 840 occurs, in which the smoke alarm sounds a notification to the occupants that smoke has been sensed. If the IR sensor sees heat from the heating appliance, a step 850 occurs, whereby the smoke alarm enters a "hush" or "off" mode for a predetermined period of time. At step 860, this predetermined period of hush mode times out, sending the methodology back to step 810, to restart the process.

Figure 17:
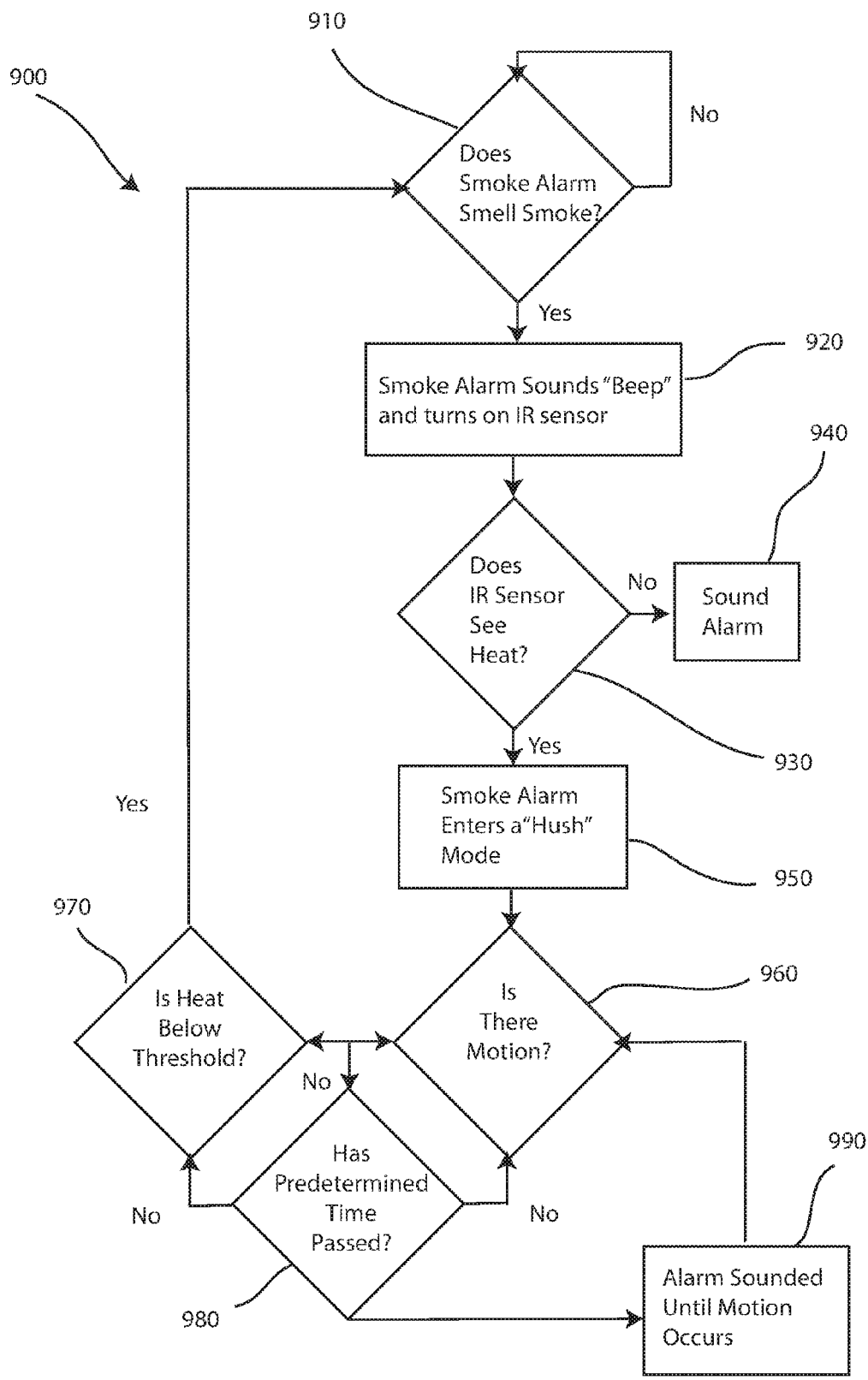
FIG. 17 depicts a flow diagram of another method for monitoring a room in accordance with one embodiment.

Referring now to FIG. 17, another exemplary flow diagram 900 is shown. The flow diagram includes a first step 910 of determining whether a smoke alarm, such as the alarm 712, smells smoke. If no, the smoke alarm continues to remain active. If yes, the flow diagram proceeds to a second step 920, whereby the smoke alarm sounds a "beep" and turns on an IR sensor, such as the sensing structure 714. A next step 930 determines whether the IR sensor sees heat at a location of a heating appliance within a short time period after the warning "beep" sounds. If no, a step 940 occurs, in which the smoke alarm sounds a notification to the occupants that smoke has been sensed. If the IR sensor sees heat from the heating appliance, a step 950 occurs, whereby the smoke alarm enters a "hush" or "off" mode. During the "hush" or "off" mode, the next step 960 occurs, whereby the IR sensor looks for heat above the threshold, and for motion in the vicinity of the heat. At a step 970, if it is determined that the heat is below the threshold, the system goes back to step 910. At step 980, the system determines whether a predetermined period of time has passed where heat is above the threshold and there has not been motion in the vicinity. At a step 990, if this predetermined period of time has passed, an alarm is sounded until motion occurs. Once motion occurs, the process goes back to step 960.

Further disclosed is a method of monitoring a room that includes detecting, by a detecting device such as the detecting device 710, at least one of smoke and heat. The method may further include determining, by a sensing structure, such as the sensing structure 714, that a heating apparatus, such as the heating apparatus 716, has a temperature that is above a threshold. In response to the determining that the heating apparatus has a temperature that is above a threshold, performing, by a processor such as the processor 718, at least one of: a) turning off at least one of an alarm, such as the alarm 712, and the detecting device; and b) reducing the sensitivity of the detecting device. The method may further include notifying, with the alarm, a user after the detecting at least one of smoke and heat, if the sensing structure determines that the heating apparatus has a temperature that is below the threshold.

The method may further include waiting, by the processor, a predetermined period after the sensing structure determines that the heating apparatus has a temperature that is below the threshold before at least one of: turning on the at least one of the alarm and the detecting device; and increasing the sensitivity of the detecting device.

The sensing structure may be an infrared sensor, and the method may further include determining, by the infrared sensor, whether a person is proximate the heating apparatus by sensing a temperature drop when the user walks between the sensing structure and the heating apparatus and the sensing structure is spaced apart from the heating apparatus. The method may still further include determining, by the infrared sensor, whether the heating apparatus has the temperature that is above the threshold.

The method may still further include sensing, by the infrared sensor, a rapid increase in UV energy and/or IR wavelengths, and activating, by the processor, at least one of the alarm and a second alarm after the sensing by the infrared sensor of the rapid increase in UV energy and/or IR wavelengths. The method of may include disabling by default the sensing structure, and enabling the sensing structure after the detecting device detects at least one of smoke and heat. The method may include issuing, by the alarm, an unobtrusive notification immediately after the detecting, by the detecting device, the at least one of smoke and heat. The method may include locating the sensing structure, and at least one of the detecting device and the alarm, in disparate locations. Further, the method may include connecting by a wireless or wired connection the sensing structure and at least one of the detecting device and the alarm. The method may include waiting for a predetermined period after the detecting and before the notifying. Still further, the method may include performing a countdown during the performing, by the processor, of the turning off at least one of an alarm and the detecting device or reducing the sensitivity of the detecting device. The method may include determining, by the sensing structure, whether a person is proximate the heating apparatus, and resetting, by the processor, the countdown each time the sensing structure determines that a person is proximate the heating apparatus, and further notifying the user when the processor reaches the end of the countdown.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

We claim:
1. A monitoring system comprising:
a detecting device configured to detect at least one of smoke and heat;
an alarm in operable communication with the detecting device, wherein the alarm is configured to notify a user after the detecting device detects at least one of smoke and heat;
a sensing structure configured to determine whether a heating apparatus has a temperature that is above a threshold; and
a processor in operable communication with the sensing structure and at least one of the detecting device and the alarm, the processor configured to at least one of:
a) turn off at least one of the alarm and the detecting device; and
b) reduce the sensitivity of the detecting device,
when the sensing structure determines that the heating apparatus has a temperature that is above a threshold;
wherein the processor is configured to at least one of:
turn on the at least one of the alarm and the detecting device; and
increase the sensitivity of the detecting device,
after the sensing structure determines that the heating apparatus has a temperature that is below the threshold.

2. The monitoring system of claim 1, wherein the processor is configured to wait for a predetermined period after the sensing structure determines that the heating apparatus has a temperature that is below the threshold to turn on the at least one of the alarm and the detecting device.

3. The monitoring system of claim 1, wherein the sensing structure is an ultraviolet sensor configured to determine whether a person is proximate the heating apparatus by sensing a temperature drop when the user walks between the sensing structure and the heating apparatus and the sensing structure is spaced apart from the heating apparatus, and wherein the ultraviolet sensor is further configured to determine whether the heating apparatus has the temperature that is above the threshold.

4. The monitoring system of claim 3, wherein the ultraviolet sensor is configured to sense a rapid increase in UV energy, and wherein processor is configured to activate at least one of the alarm and a second alarm after the ultraviolet sensor senses the rapid increase in UV energy.

5. The monitoring system of claim 4, wherein the processor is configured to wait for a predetermined period after the ultraviolet sensor senses the rapid increase in UV energy before the processor activates at least one of the alarm and the second alarm.

6. The monitoring system of claim 1, wherein the sensing structure is disabled by default and becomes enabled after the detecting device detects at least one of smoke and heat.

7. The monitoring system of claim 1, wherein the alarm is configured to issue an unobtrusive notification immediately when the detecting device detects at least one of smoke and heat.

8. The monitoring system of claim 1, wherein the sensing structure and at least one of the detecting device and the alarm are located in disparate locations and connected by a wireless or wired connection.

9. A monitoring system comprising:
a detecting device configured to detect at least one of smoke and heat;
an alarm in operable communication with the detecting device, wherein the alarm is configured to notify a user after the detecting device detects at least one of smoke and heat;
a sensing structure configured to determine whether a heating apparatus has a temperature that is above a threshold; and
a processor in operable communication with the sensing structure and at least one of the detecting device and the alarm, the processor configured to at least one of:
a) turn off at least one of the alarm and the detecting device; and
b) reduce the sensitivity of the detecting device,
when the sensing structure determines that the heating apparatus has a temperature that is above a threshold;
wherein the processor is configured to wait for a predetermined period after the detecting device detects at least one of smoke and heat before activating the alarm to notify the user, wherein if, during the predetermined period, the sensing structure determines that the heating apparatus has a temperature that is above a threshold, the processor is configured to at least one of a) and b), wherein when the processor is configured to at least one of a) and b) the processor is further configured to perform a countdown, wherein the sensing structure is configured to determine whether a person is proximate the heating apparatus, wherein the countdown is reset each time the sensing structure determines that a person is proximate the heating apparatus, and wherein the alarm is configured to notify the user when the processor reaches the end of the countdown.

10. A method of monitoring a room comprising:
detecting, by a detecting device, at least one of smoke and heat;
determining, by a sensing structure, that a heating apparatus has a temperature that is above a threshold;
in response to the determining that the heating apparatus has a temperature that is above a threshold, performing, by a processor, at least one of:
a) turning off at least one of an alarm and the detecting device; and
b) reducing the sensitivity of the detecting device; and
notifying, with the alarm, a user after the detecting at least one of smoke and heat, if the sensing structure determines that the heating apparatus has a temperature that is below the threshold.

11. The method of claim 10, further comprising waiting, by the processor, a predetermined period after the sensing structure determines that the heating apparatus has a temperature that is below the threshold before at least one of:
turning on the at least one of the alarm and the detecting device; and
increasing the sensitivity of the detecting device.

12. The method of claim 10, wherein the sensing structure is an ultraviolet sensor, and further comprising determining, by the ultraviolet sensor, whether a person is proximate the heating apparatus by sensing a temperature drop when the user walks between the sensing structure and the heating apparatus and the sensing structure is spaced apart from the heating apparatus, and determining, by the ultraviolet sensor, whether the heating apparatus has the temperature that is above the threshold.

13. The method of claim 12, further comprising sensing, by the ultraviolet sensor, a rapid increase in UV energy, and activating, by the processor, at least one of the alarm and a second alarm after the sensing by the ultraviolet sensor of the rapid increase in UV energy.

14. The method of claim 10, further comprising disabling by default the sensing structure, and enabling the sensing structure after the detecting device detects at least one of smoke and heat.

15. The method of claim 14, further comprising issuing, by the alarm, an unobtrusive notification immediately after the detecting, by the detecting device, the at least one of smoke and heat.

16. The method of claim 10, further comprising locating the sensing structure, and at least one of the detecting device and the alarm, in disparate locations, and connecting by a wireless or wired connection the sensing structure, and at least one of the detecting device and the alarm.

17. The method of claim 10, further comprising waiting for a predetermined period after the detecting and before the notifying.

18. The method of claim 17, further comprising performing a countdown during the performing, by the processor, of at least one of a) and b), further comprising determining, by the sensing structure, whether a person is proximate the heating apparatus, and further comprising resetting, by the processor, the countdown each time the sensing structure determines that a person is proximate the heating apparatus, and further notifying the user when the processor reaches the end of the countdown.

19. A monitoring system comprising:
a detecting device configured to detect at least one of smoke and heat;
an alarm in operable communication with the detecting device, wherein the alarm is configured to notify a user after the detecting device detects at least one of smoke and heat;
a sensing structure configured to determine whether a cooking apparatus has a temperature that is above a threshold; and
a processor in operable communication with the sensing structure and at least one of the detecting device and the alarm, at least one of the processor and the sensing structure configured to prevent the alarm from notifying the user as a result of smoke or heat from a cooking apparatus when the sensing structure determines that the cooking apparatus has a temperature that is above the threshold,
wherein the alarm is configured to notify a user after detecting at least one of smoke and heat if the sensing structure determines that the heating apparatus has a temperature that is below the threshold.

* * * * *

UNITED STATES PATENT AND TRADEMARK OFFICE
CERTIFICATE OF CORRECTION

Page 1 of 1

PATENT NO. : 9,739,489 B2
APPLICATION NO. : 15/147585
DATED : August 22, 2017
INVENTOR(S) : John Ronk et al.

It is certified that error appears in the above-identified patent and that said Letters Patent is hereby corrected as shown below:

Column 6, Line 54, please change "head end" to -- headend --

Column 6, Line 67, please change "headed" to -- headend --

Column 7, Line 28, please change "headed" to -- headend --

Column 7, Line 37, please change "headed" to -- headend --

Column 7, Line 58, please change "headed" to -- headend --

Column 9, Line 44, please change "headed" to -- headend --

Signed and Sealed this
Thirty-first Day of July, 2018

Andrei Iancu
*Director of the United States Patent and Trademark Office*